US012782598B2

(12) United States Patent
Almoneef et al.

(10) Patent No.: US 12,782,598 B2
(45) Date of Patent: Nov. 3, 2026

(54) PATCH-STUB METAL PROXIMITY SENSOR

(71) Applicant: Prince Sattam Bin Abdulaziz University (PSAU), Al Kharj (SA)

(72) Inventors: Thamer Almoneef, Al Kharj (SA); Rayed Alyousef, Al Kharj (SA); Muhammad Amin, Madinah (SA); Omar F. Siddiqui, Madinah (SA)

(73) Assignee: Prince Sattam Bin Abdulaziz University (PSAU), Al Kharj (SA)

( * ) Notice: Subject to any disclaimer, the term of this patent is extended or adjusted under 35 U.S.C. 154(b) by 192 days.

(21) Appl. No.: 18/909,873

(22) Filed: Oct. 8, 2024

(65) Prior Publication Data

US 2026/0098979 A1 Apr. 9, 2026

(51) Int. Cl.
*G01V 3/12* (2006.01)
*G01V 8/00* (2006.01)

(52) U.S. Cl.
CPC ................ *G01V 3/12* (2013.01); *G01V 8/005* (2013.01)

(58) Field of Classification Search
CPC . G01V 3/12; G01V 8/00; G01V 8/005; G01R 1/24; G01R 1/06788; G01R 33/34; G01R 33/3456
See application file for complete search history.

(56) References Cited

U.S. PATENT DOCUMENTS

2019/0361062 A1* 11/2019 Yamakaji ........... G01R 29/0878
2025/0290879 A1* 9/2025 Huber .................. H01Q 9/0428

FOREIGN PATENT DOCUMENTS

CN 115575720 A * 1/2023 ......... G01R 27/2688

* cited by examiner

*Primary Examiner* — Son T Le
(74) *Attorney, Agent, or Firm* — MUGHAL GAUDRY & FRANKLIN PC

(57) ABSTRACT

An apparatus of a patch-stub metal proximity sensor, the apparatus comprising: a planar dielectric substrate; a microstrip transmission line on a first surface of the planar dielectric substrate; a patch-stub on the first surface of the planar dielectric substrate substantially below the microstrip transmission line; a feedline on the first surface of the planar dielectric substrate substantially extending away from the microstrip transmission line, wherein the feedline electrically connects the microstrip transmission line and the patch-stub; and a ground conductor on a second surface of the planar dielectric substrate beneath the microstrip transmission line, wherein the planar dielectric substrate insulates the ground conductor from the microstrip transmission line, the patch-stub and the feedline.

12 Claims, 26 Drawing Sheets

2400

PATCH-STUB METAL PROXIMITY SENSOR

TECHNICAL FIELD

At least one example generally relates to sensors, and more particularly to metal detection and proximity sensors, employing a patch-stub for sensing proximity of a metal object.

BACKGROUND

Detecting proximity of a metal is a requirement in various applications, including quality control, safety, and maintenance of systems. Current devices have limited sensitivity and range, particularly when metal objects are to be identified. These limitations can lead to safety hazards, operational inefficiencies, and increased costs. Resonance-based sensors utilizing microstrip transmission lines and stub structures exhibit either enhanced sensitivity or better range, but not both. Moreover, these sensors may detect either exposed or buried metal objects but not both.

The background description provided here is for the purpose of generally presenting the context of the disclosure. Unless otherwise indicated here, the material described in this section is not prior art to the claims in this application and are not admitted to be prior art by inclusion in this section.

BRIEF DESCRIPTION OF THE DRAWINGS

At least one embodiment may be understood more fully from detailed description given below and from accompanying drawings, which, however, should not be taken to be limiting, but are for explanation and understanding.

GLOSSARY OF SYMBOLS

| | |
|---|---|
| S11 | Reflection scattering parameter. |
| S21 | Transmission scattering parameter. |
| RF | Radio frequency. |
| P | Proximity of a metal object from a sensor. |
| S | Scaling factor for the surface area of a metal object |
| PCB | Printed circuit board. |
| ADC | Analog-to-digital converter. |
| IF | Intermediate frequency. |
| LNA | Low noise amplifier. |
| LO | Local Oscillator. |

DETAILED DESCRIPTION

Some examples disclose a metal proximity sensor, which provides better range, sensitivity, and reliability, capable of detecting the proximity of both exposed and concealed (or buried) metal objects. In at least one example, a patch-stub metal proximity sensor is provided to detect the proximity value of a metal object placed within the detection range of the patch-stub metal proximity sensor. The patch-stub metal proximity sensor can be fabricated on a printed circuit board by etching a microstrip transmission line, a feedline, and a patch-stub on a first surface of a planar dielectric substrate, and a shorter ground conductor on a second surface of the planar dielectric surface to increase the sensitivity of the patch-stub metal proximity sensor. By applying a wideband signal to the microstrip transmission line, the patch-stub of the patch-stub metal proximity sensor resonates at a unique resonance frequency. The transmission scattering parameter and impedance of the patch-stub metal proximity sensor varies significantly, due to the shorter ground conductor, when the proximity values of a metal object from the sensor changes.

In the following description, numerous details are provided about different examples of the present disclosure. It will be apparent, however, to one skilled in the art, that the examples of the present disclosure may be practiced without these specific details. In other instances, well-known structures and devices are shown in a block diagram form, rather than in detail, to avoid obscuring examples of the present disclosure.

Note that in the corresponding drawings of the examples, curves are represented with lines. Some lines may be thicker or dashed to differentiate between them. Such indications are not intended to be limiting. Rather, the lines are used in connection with one or more examples to facilitate easier understanding of a plot.

It is pointed out that those elements of the figures having the same reference numbers (or names) as the elements of any other figure can operate or function in any manner like that described but are not limited to such.

Figure 1:
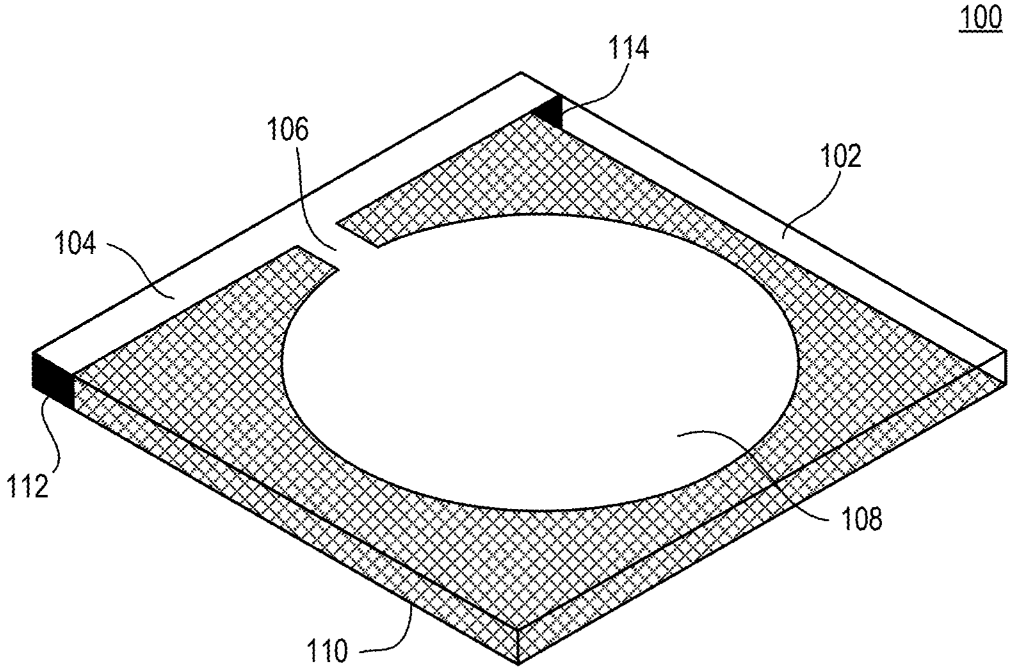
FIG. 1 is a schematic of a patch-stub resonator, in accordance with at least one example.

FIG. 1 is a schematic that illustrates a patch-stub resonator 100, in accordance with at least one example. Patch-stub resonator 100 comprises a planar dielectric substrate 102, a microstrip transmission line 104, a feedline 106, a circular patch 108, and a ground conductor 110. Microstrip transmission line 104, feedline 106, and circular patch 108 lie on the top surface of planar dielectric substrate 102, and ground conductor 110 lies on the bottom surface of planar dielectric substrate 102, in accordance with at least one example. In at least one example, feedline 106 electrically connects microstrip transmission line 104 and circular patch 108. In at least one example, ground conductor 110 substantially overlaps with microstrip transmission line 104, feedline 106, and circular patch 108 which acts as an open-ended stub for the patch-stub resonator 100. In at least one example, feedline 106 and circular patch 108 lie substantially in the middle of microstrip transmission line 104, and RF ports 112 and 114 are placed at the ends of microstrip transmission line 104. In at least one example, when patch-stub resonator 100 is supplied with a radio frequency (RF) signal through RF ports 112 and 114, patch-stub resonator 100 resonates at a specific resonant frequency. In at least one example, patch-stub resonator 100 is modelled on a Rogers RT/Duroid 6002 printed circuit board (PCB), which has a dielectric constant of approximately 2.94. The specific dimensions and layout of the resonator elements are designed to achieve the desired resonant frequency and impedance characteristics.

Figure 2:
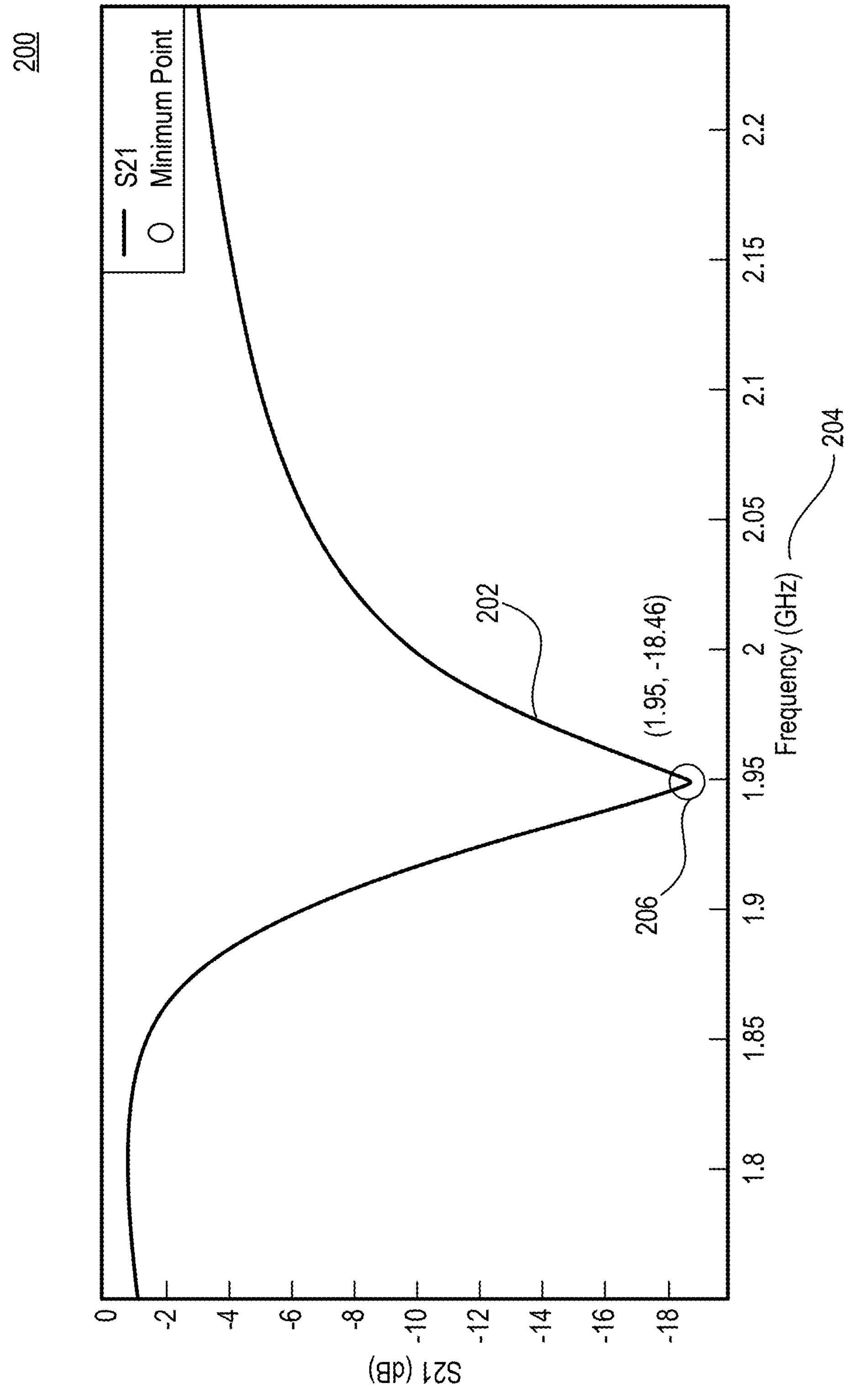
FIG. 2 is a plot of S21 scattering parameter of a patch-stub resonator of FIG. 1, in accordance with at least one example.

FIG. 2 is a plot 200 of an S21 scattering parameter of patch-stub resonator 100 of FIG. 1, in accordance with at least one example. Curve 202, showing variations in S21 scattering parameter of patch-stub resonator 100 when a frequency 204 of an RF signal is gradually increased from 1.75 GHz to 2.25 GHz, illustrates the transmission characteristics of patch-stub resonator 100 in the frequency range. Plot 200 illustrates a dip 206 of −18.46 decibels at a resonant frequency of 1.95 GHz, indicating a strong resonance and precise tuning of patch-stub resonator 100, in accordance with at least one example. Frequency 204 at which dip 206 occurs may vary based on the dimensions of patch-stub resonator 100. Frequency 204 is a characteristic for its application as a metal proximity sensor, in accordance with at least one example.

Figure 3:
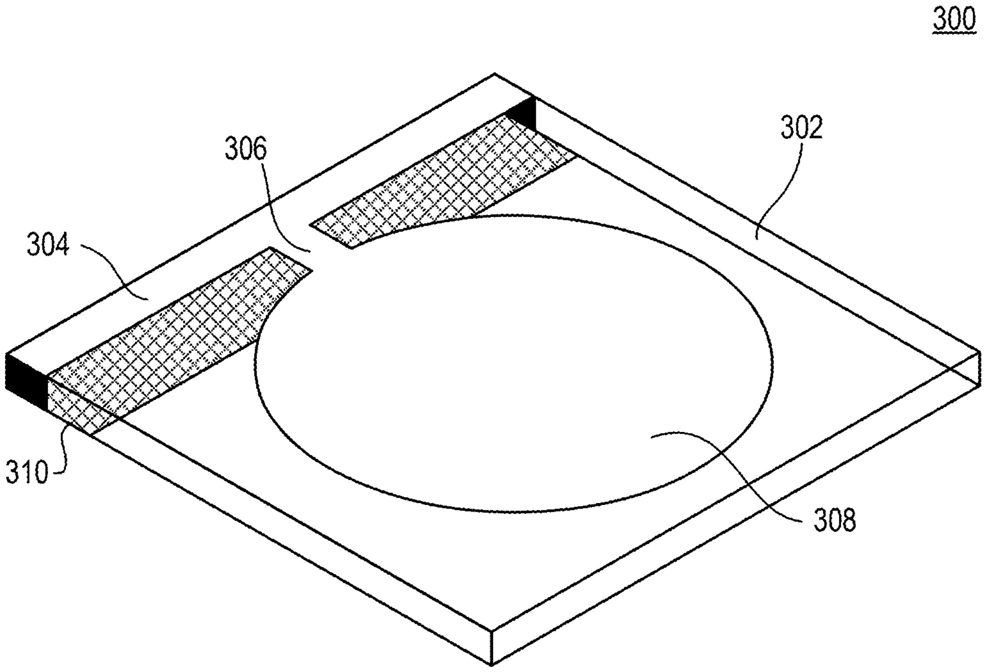
FIG. 3 is a schematic of a patch-stub metal proximity sensor, in accordance with at least one example.

FIG. 3 is a schematic that illustrates a patch-stub metal proximity sensor 300, in accordance with at least one example. Patch-stub metal proximity sensor 300 comprises planar dielectric substrate 302, microstrip transmission line 304, feedline 306, and circular patch 308, like the microstrip transmission line 104, feedline 106, and circular patch 108 of patch-stub resonator 100; however, it features a relatively shorter ground conductor 310 compared to ground conductor 110 of FIG. 1. In at least one example, ground conductor 310 substantially overlaps with microstrip transmission line 304 and feedline 306. This shorter ground conductor 310 influences the variations in transmission scattering parameter S21 of patch-stub metal proximity sensor 300, such that the sensitivity of detecting nearby metal objects increases. In at least one example, ground conductor 310 covers microstrip transmission line 304, feedline 306, and a small width of circular patch 308, which may be adjusted to fine-tune the response of patch-stub metal proximity sensor 300 to the proximity of a metal object.

Figure 4:
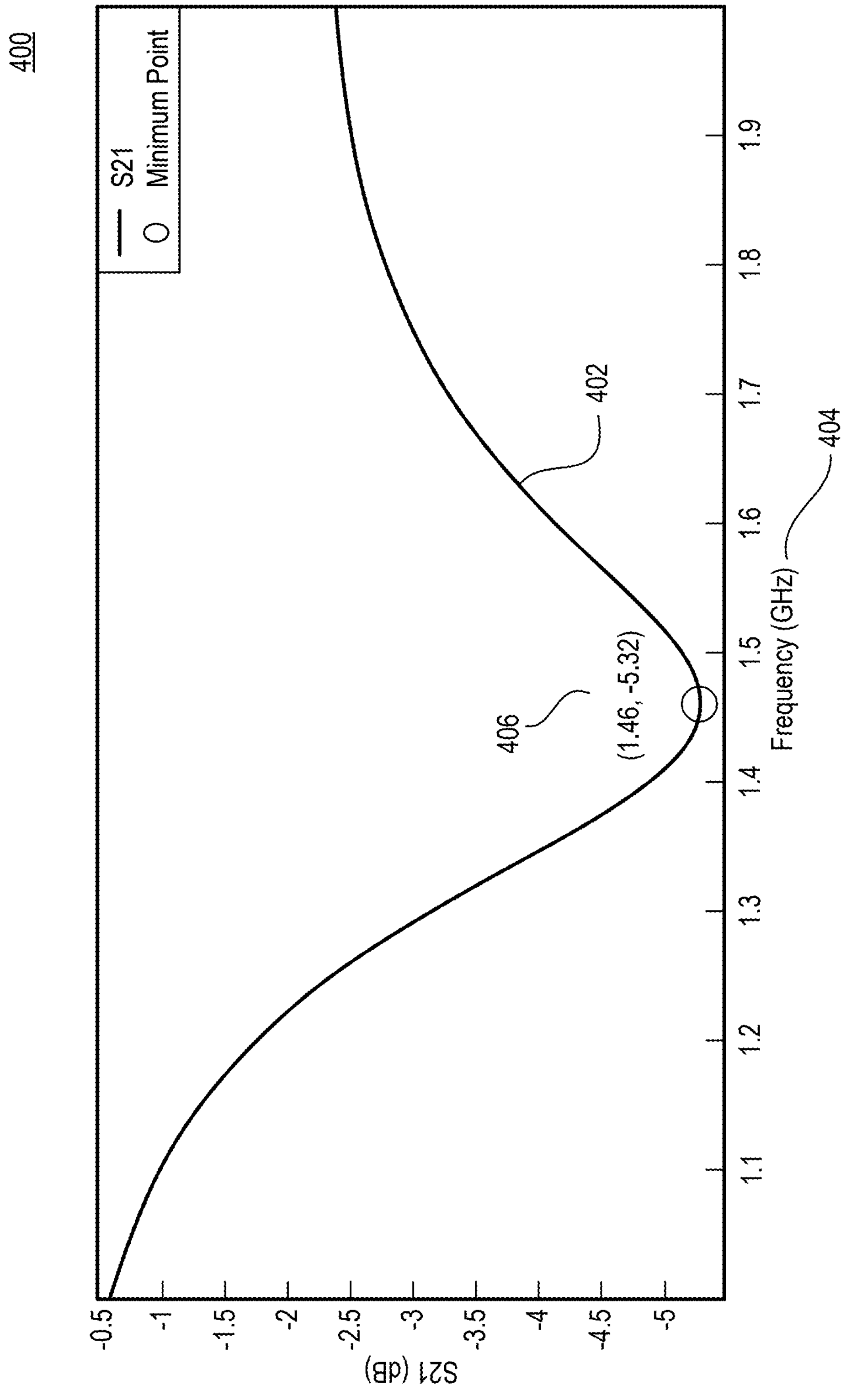
FIG. 4 is a plot of S21 scattering parameter of a patch-stub metal proximity sensor of FIG. 3, in accordance with at least one example.

FIG. 4 is a plot 400 of the S21 scattering parameter of patch-stub metal proximity sensor 300 of FIG. 3, in accordance with at least one example. Curve 402 shows variations in the S21 scattering parameter of patch-stub metal proximity sensor 300 when a frequency 404 of an RF signal gradually increases from 1 GHz to 2 GHz. The S21 scattering parameter illustrates the transmission characteristics of patch-stub metal proximity sensor 300 in the frequency range. Plot 400 illustrates a dip 406 of −5.32 decibels at a resonant frequency of 1.46 GHz, indicating that the variation pattern of curve 402 of patch-stub metal proximity sensor 300 has significantly changed in comparison to scattering parameter curve 202 of patch-stub resonator 100. The change in variation pattern is due to shorter ground conductor 310, which alters the electric field distribution of patch-stub metal proximity sensor 300 and its sensitivity to nearby metal objects. The shift in the resonant frequency and the reduced depth of dip 406 highlight the impact of modifying the size of a ground conductor, in accordance with at least one example.

Figure 5:
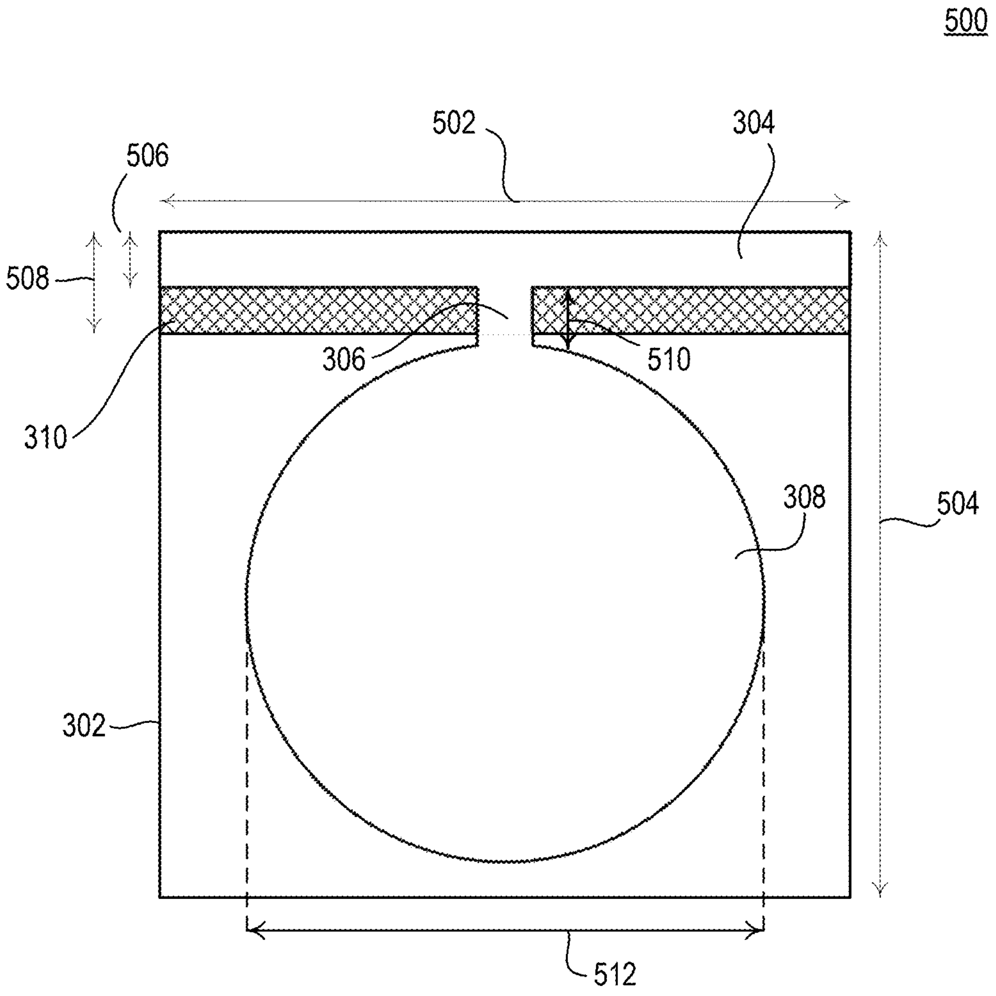
FIG. 5 is a schematic of a top dimensional view of the patch-stub metal proximity sensor of FIG. 3, in accordance with at least one example.

FIG. 5 is a schematic that illustrates a top dimensional view 500 of patch-stub metal proximity sensor 300 of FIG. 3, in accordance with at least one example. In this example, width 502 and length 504 of planar dielectric substrate 302 are 60 millimeters and 64 millimeters, respectively. Width 506 of microstrip transmission line 304 is 2 millimeters while width 508 of ground conductor 310 is 6 millimeters. Length 510 of feedline 306 is 6.12 millimeters and diameter 512 of circular patch 308 is 54 millimeters, in accordance with at least one example. Patch-stub metal proximity sensor 300 is modelled on a Rogers RT/Duroid 6002 PCB, featuring planar dielectric substrate 302 with a thickness of 0.762 millimeters and a metal thickness of 0.018 micrometers. These dimensions and material properties are selected to optimize the sensitivity of patch-stub metal proximity sensor 300 to varying proximity values of a metal object to provide consistent performance across various use cases.

Figure 6:
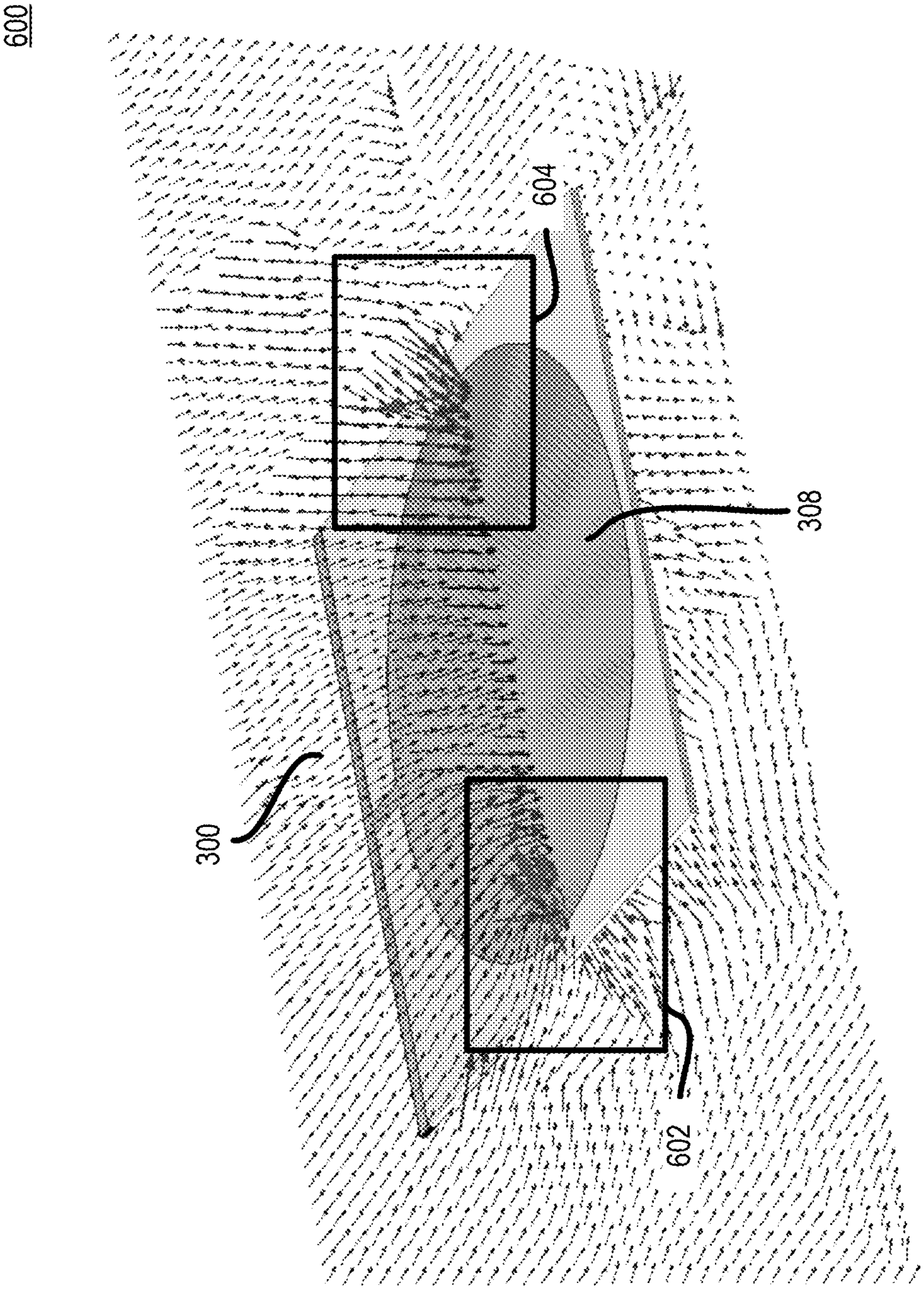
FIG. 6 is a field plot of a patch-stub metal proximity sensor, illustrating an electric field distribution that is orthogonal to a center of the patch-stub, in accordance with at least one example.

FIG. 6 is a field plot 600 of patch-stub metal proximity sensor 300, illustrating the electric field distribution that is orthogonal to the center of a circular patch 308, in accordance with at least one example. Field plot 600 is generated under conditions where no metal objects are in the proximity to patch-stub metal proximity sensor 300. Field plot 600 illustrates the distribution of electric fields across and around circular patch 308. Notably, two regions 602 and 604 located at outer edges of circular patch 308 exhibit strong electric field intensities of approximately 2910 volts/meter. These regions indicate concentrated energy storage at a resonant frequency of 1.5 GHz, determining sensitivity of patch-stub metal proximity sensor 300. Symmetric distribution of electric fields in regions 602 and 604 indicate an equal distribution of currents around circular patch 308, a characteristic essential for a stable operation and predictable performance for patch-stub metal proximity sensor 300. The field patterns serve as a baseline for a better understanding of perturbations in the electric field in the presence of metal objects, which in turn alters response characteristics of patch-stub metal proximity sensor 300, enabling the detection of proximity of a metal object.

Figure 7:
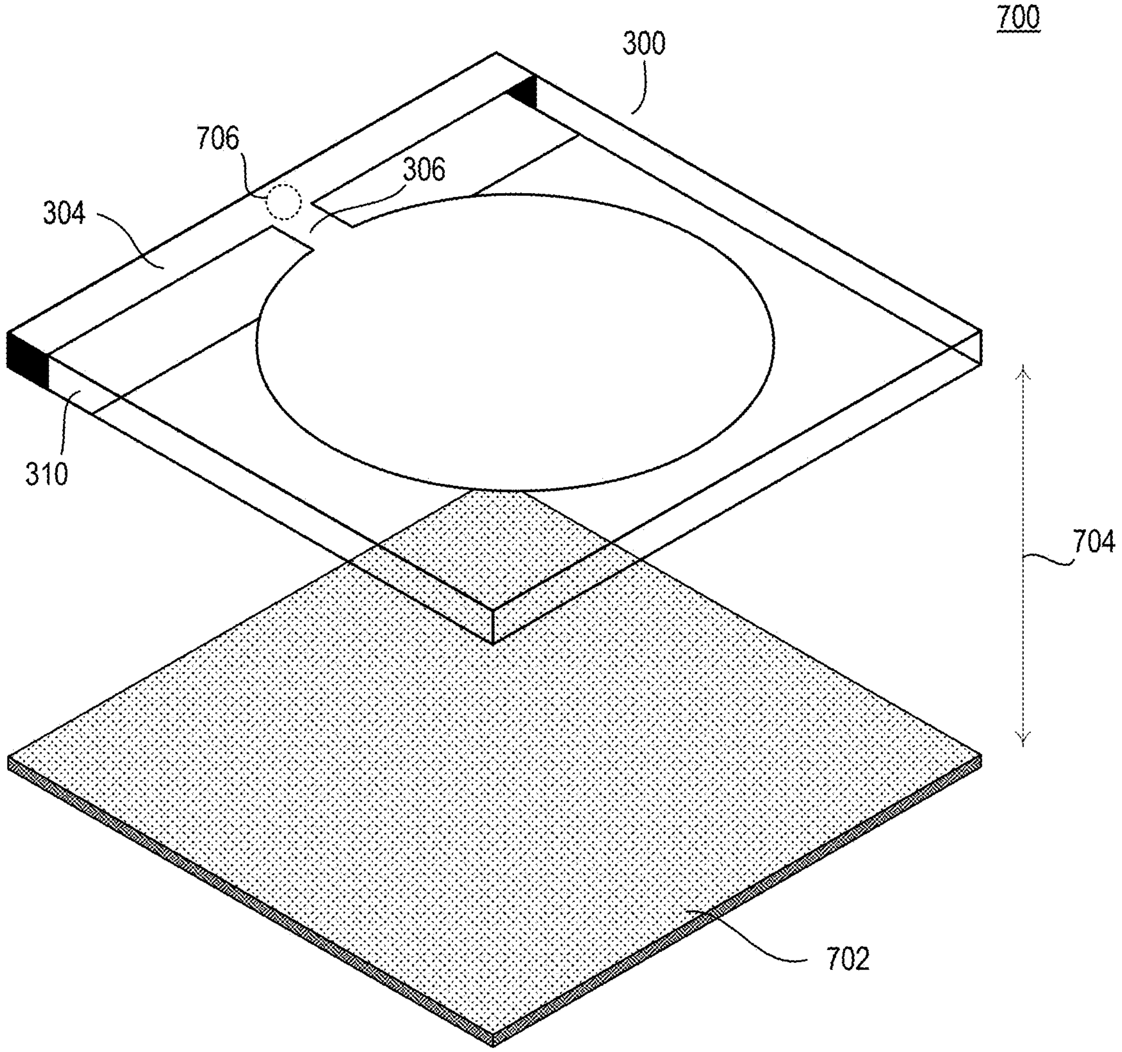
FIG. 7 is a schematic of a simulation setup in which a patch-stub metal proximity sensor is positioned above a metal object, in accordance with at least one example.

FIG. 7 is a schematic to a simulation setup 700 in which patch-stub metal proximity sensor 300 is positioned above a metal object 702 at a proximity value 704, in accordance with at least one example. Shorter ground conductor 310 increases the sensitivity of patch-stub metal proximity sensor 300 when a metal object 702 is placed at a proximity value 704 beneath patch-stub metal proximity sensor 300. Even small changes in the values of proximity 704 of metal object 702 affect the response of S21 scattering parameter of patch-stub metal proximity sensor 300, leading to measurable variations in the resonant frequency and amplitude of a transmitted RF signal. This sensitivity enables applications, requiring the precise position of a metal object to be detected. The impedance of patch-stub metal proximity sensor 300 is also affected at node 706, where microstrip transmission line 304 and feedline 306 connect, when the values of proximity 704 of a metal object 702 are varied.

Figure 8:
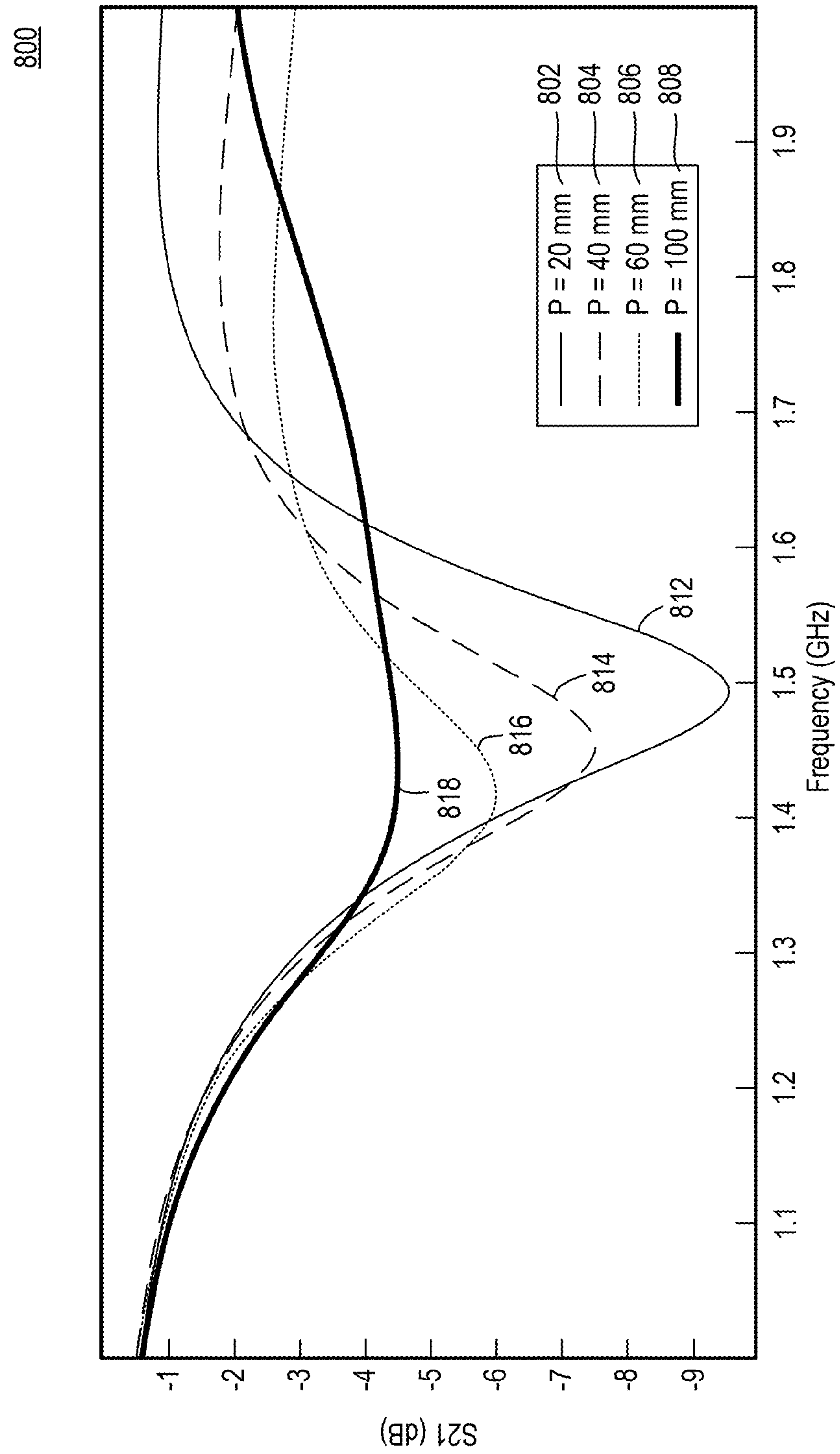
FIG. 8 is a plot of S21 scattering parameter of a patch-stub metal proximity sensor, illustrating variations in the scattering parameter with changes in the proximity values of a metal object, in accordance with at least one example.

FIG. 8 is a plot 800 of the S21 scattering parameter of patch-stub metal proximity sensor 300, illustrating variations in the S21 scattering parameter with changes in the values of proximity 704 of a metal object 702 of FIG. 7, in accordance with at least one example. At a proximity value 802 of 20 millimeters, curve 812 exhibits a strong resonance at 1.495 GHz with an S21 value of −9.55 decibels. As proximity value is increased from 802 (P=20 millimeters) to 808 (P=100 millimeters), the corresponding S21 curves are 812 and 818, respectively. Curve 814 exhibits resonance at 1.453 GHz with an S21 value of −7.52, curve 816 exhibits resonance at 1.418 GHz with an S21 value of −6.02 decibels, and curve 818 exhibits resonance at 1.427 GHz with an S21 value −4.52 decibels. These shifts in the resonance patterns show a strong role of the values of proximity 704 on the value of resonant frequency and amplitude of a transmitted signal; as a result, patch-stub metal proximity sensor 300 can better determine proximity 704 at which metal object 702 is placed.

Figure 9:
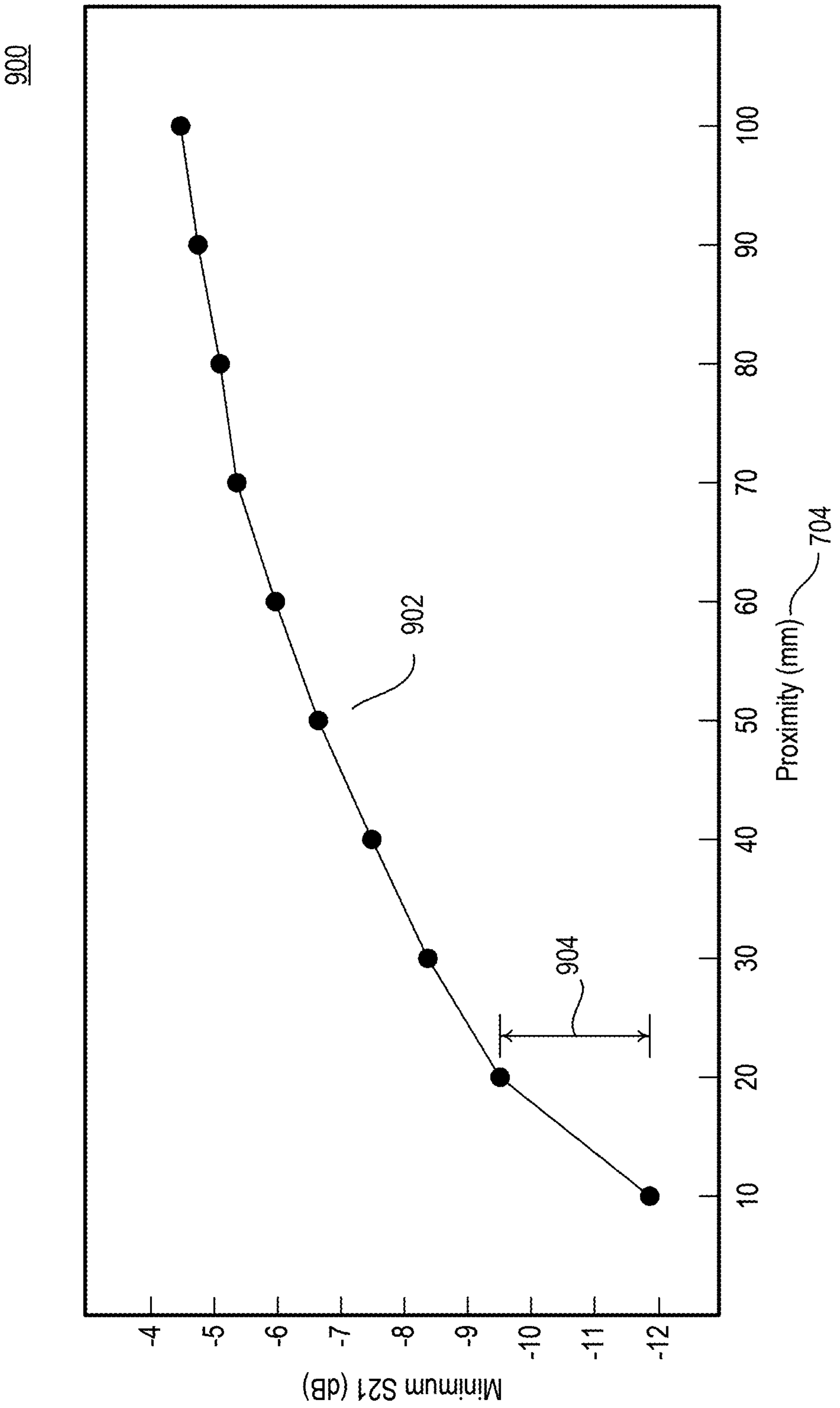
FIG. 9 is a plot of minimum of S21 scattering parameter of a patch-stub metal proximity sensor, illustrating variations in the scattering parameter with changes in the proximity values of a metal object, in accordance with at least one example.

FIG. 9 is a plot 900 illustrating a curve 902 of minimum S21 of patch-stub metal proximity sensor 300, showing variations in S21 with changes in the values of proximity 704 of metal object 702, in accordance with at least one example. Proximity 704 of metal object 702 is increased from 10 millimeters to 100 millimeters in steps of 10 millimeters. Curve 902 illustrates the change in minimum S21 across a frequency range of 1 GHz to 2 GHz. Minimum S21 shifts noticeably, as indicated by a shift 904 of 2.356 decibels, resulted from −11.9065 decibels at a proximity 704 value of 10 millimeters to −9.5501 decibels at a proximity 704 value of 20 millimeters. Eventually, minimum S21 settles to −4.5233 decibels at a proximity 704 value of 100 millimeters. Shift in minimum S21 across various proximity values confirms that patch-stub metal proximity sensor 300 can find position of a metal object 702, highlighting the capability of patch-stub metal proximity sensor 300 to measure changes in proximity values with a higher degree of sensitivity.

Figure 10:
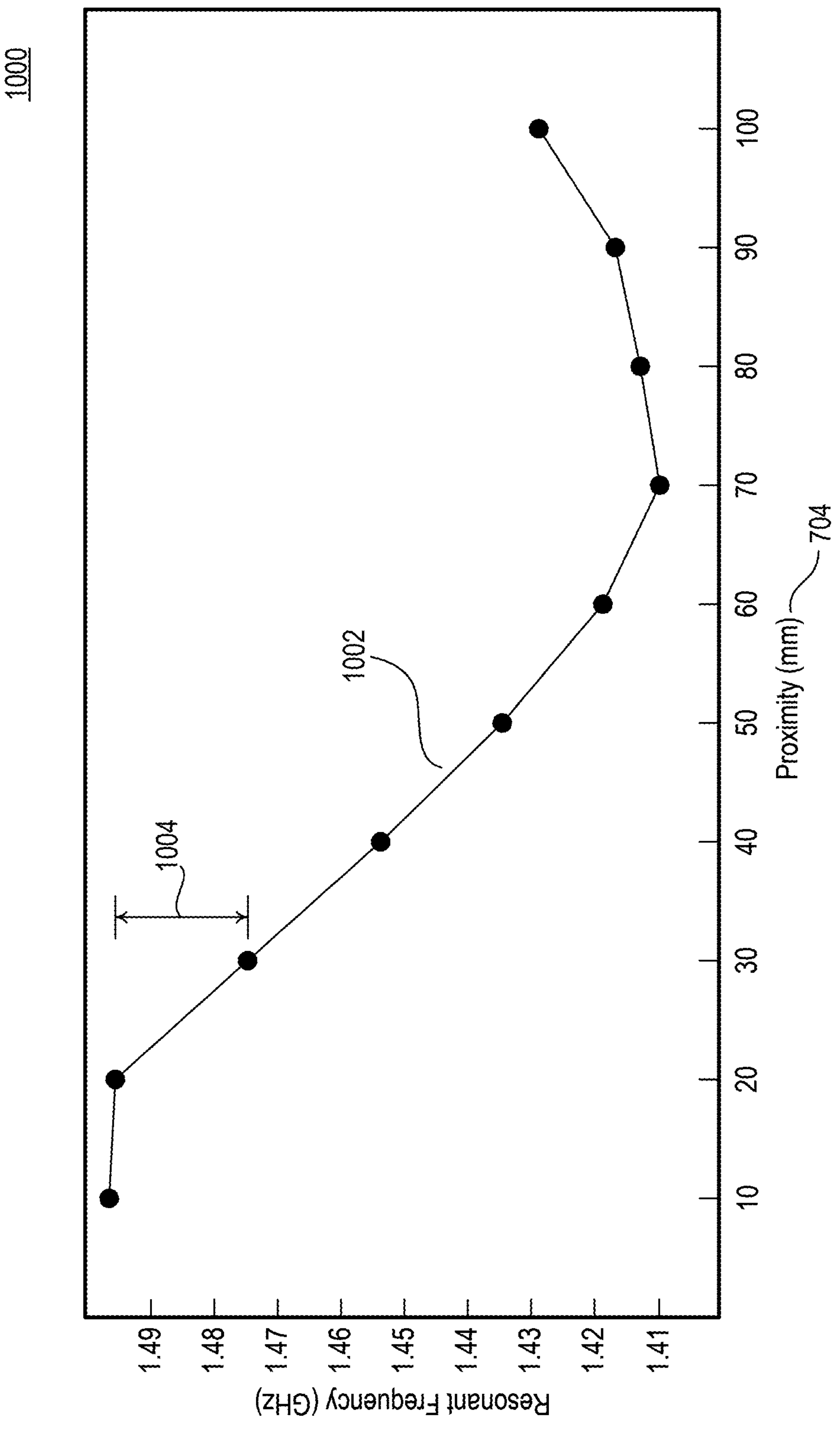
FIG. 10 is a plot of resonant frequencies of a patch-stub metal proximity sensor, illustrating variations in the resonant frequencies with changes in the proximity values of a metal object, in accordance with at least one example.

FIG. 10 is a plot 1000 illustrating a curve 1002 of resonant frequencies of patch-stub metal proximity sensor 300, showing variations in curve 1002 with changes in the values of proximity 704 of metal object 702, in accordance with at least one example. In this example, the value of proximity 704 of metal object 702 is increased from 10 millimeters to 100 millimeters in steps of 10 millimeters, enabling analysis of the response of patch-stub metal proximity sensor 300. The resonance frequency shifts significantly with changes in the values of proximity, demonstrating the sensitivity of patch-stub metal proximity sensor 300 to measure the different proximity values of metal object 702. For example, a shift 1004 of −21 MHz is observed as the resonance frequency is decreased from 1.495 GHz (at a proximity 704 value of 20 millimeters) to 1.474 GHz (at a proximity 704 value of 30 millimeters). This decreasing pattern continues as the values of proximity 704 are increased, settling at a resonance frequency of 1.4284 GHz at a proximity 704 value of 100 millimeters. In at least one example, this shift in resonance frequencies with varying distances provides a reliable metric to measure the values of proximity 704 of metal object 702. Consequently, patch-stub metal proximity sensor 300 can accurately measure even slight changes in the values of proximity 704, enabling applications that require precise measurement of proximity of an object.

Figure 11:
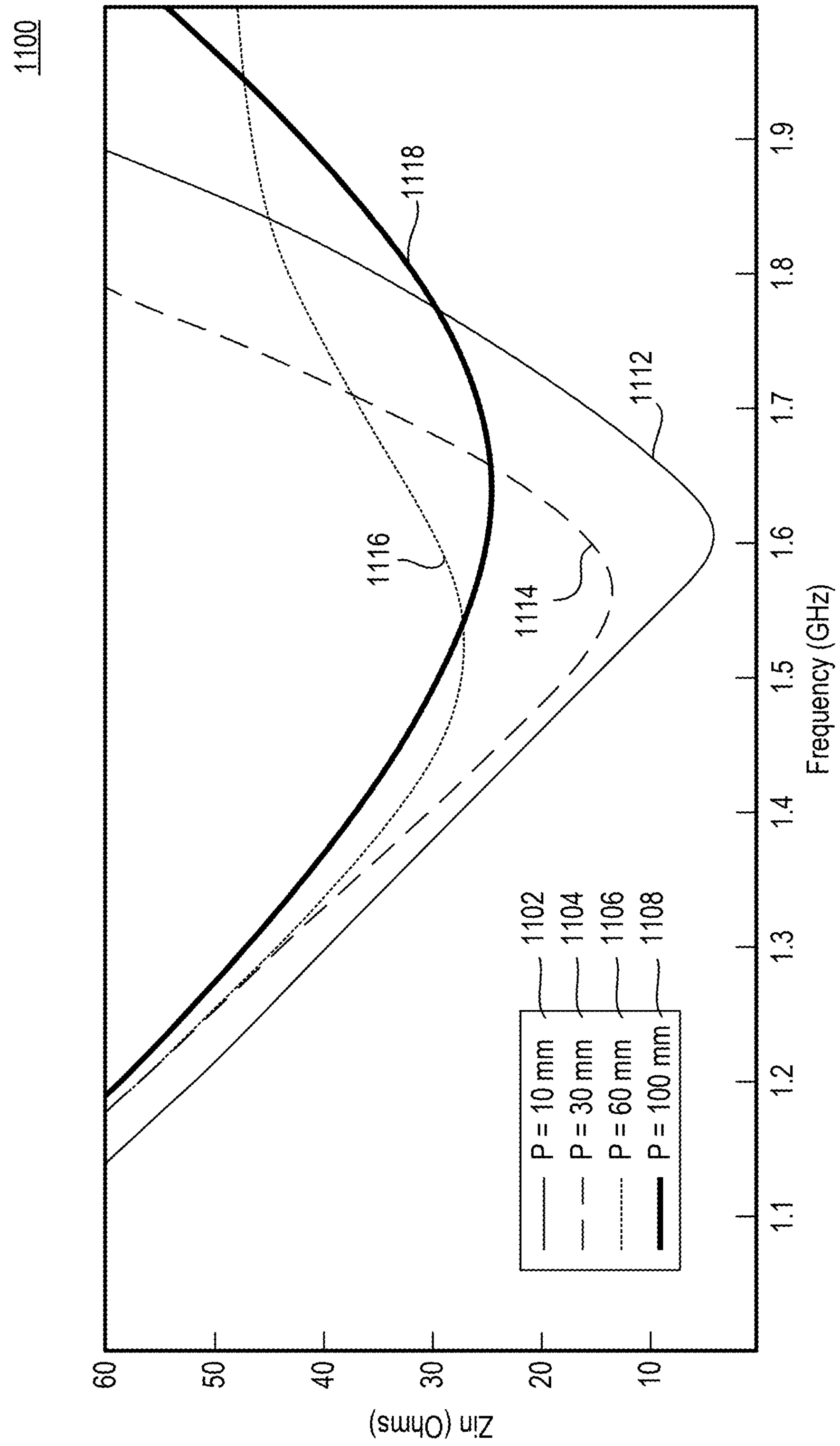
FIG. 11 is a plot of an impedance profile of a patch-stub metal proximity sensor placed at a microstrip transmission line and a feedline node, illustrating variations in an impedance profile with changes in proximity values of a metal object, in accordance with at least one example.

FIG. 11 is a plot 1100 of the impedance of patch-stub metal proximity sensor 300 at node 706, illustrating variations in the impedance with changes in the values of proximity 704 of metal object 702 of FIG. 7, in accordance with at least one example. The values of proximity 704 of metal object 702 increases from 1102 (P=10 millimeters) to proximity values of 1108 (P=100 millimeters), with intermediate measurements taken at proximity values of 1104 (P=30 millimeters) and 1106 (P=60 millimeters). Curve 1112 at a proximity values of 10 millimeters shows a minimum impedance of 4 ohms at the resonating frequency of 1.61 GHz. As the values of proximity 704 increases, the impedance curves also shift, exhibiting the sensitivity of patch-stub metal proximity sensor 300 with varying proximity values. For instance, curve 1114, recorded at a proximity values of 30 millimeters, shows a minimum impedance of 13 ohms at the resonating frequency of 1.58 GHz. When value of proximity 704 further increases to 60 millimeters, curve 1116 shows the value of minimum impedance is 27 ohms at the resonating frequency of 1.52 GHz. Finally, at the proximity value of 100 millimeters, curve 1118 shows the value of minimum impedance is 25 ohms at the resonating frequency 1.64 GHz. These shifts in patterns of minimum impedance, which directly determines the current drawn by patch-stub metal proximity sensor 300, shows the sensitivity of patch-stub metal proximity sensor 300 to the values of proximity 704 of a metal object 702, enabling precise measurement of distance at which metal objects are placed.

Figure 12:
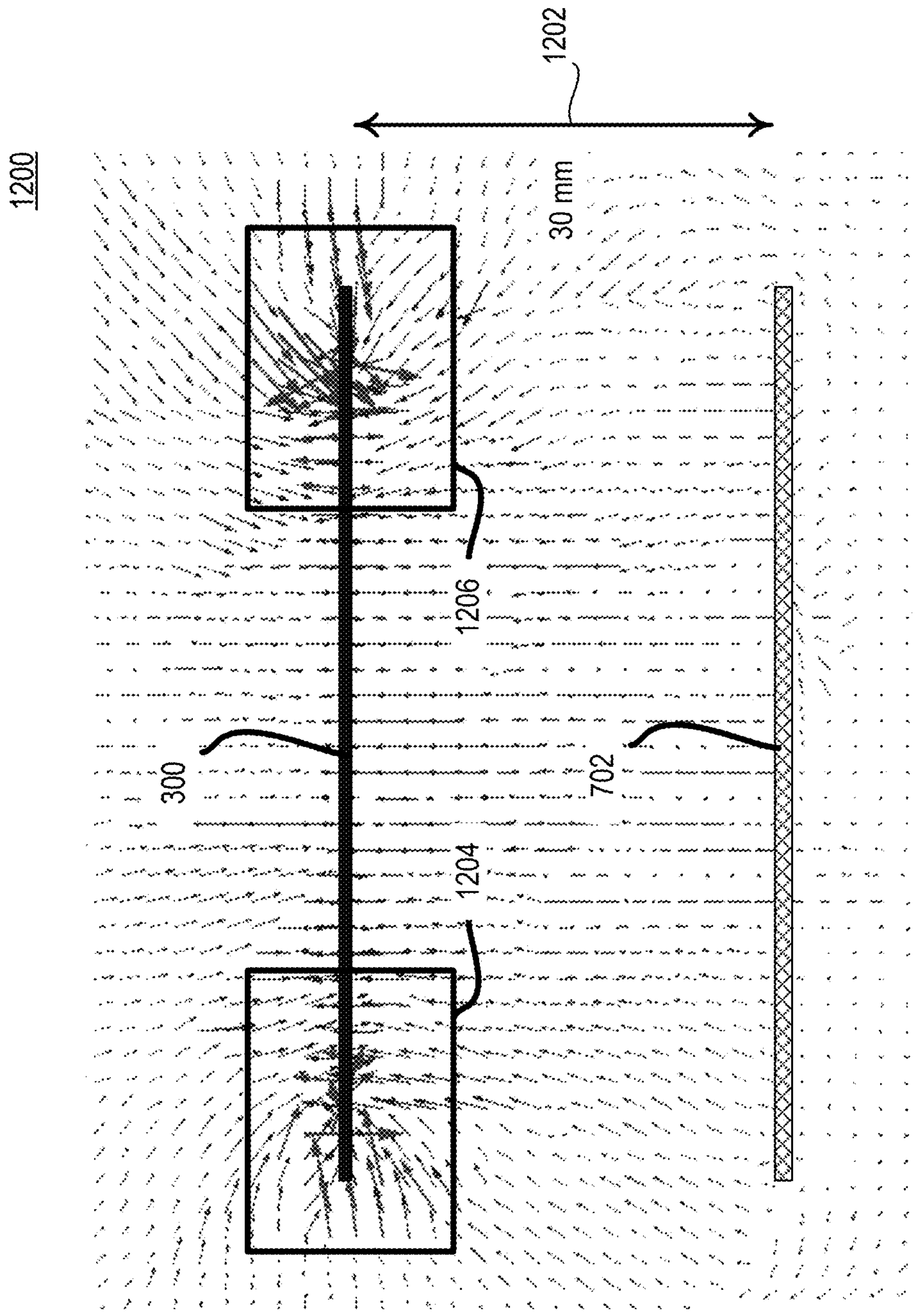
FIG. 12 is a field plot of a patch-stub metal proximity sensor, illustrating an electric field distribution that is orthogonal to a center of a patch-stub in a presence of a metal object at a proximity value of 30 millimeters from the patch-stub metal proximity sensor, in accordance with at least one example.

FIG. 12 is a field plot 1200 of patch-stub metal proximity sensor 300, illustrating the distribution of an electric field in the presence of metal object 702 that is placed at a proximity 1202 value of 30 millimeters, in accordance with at least one example. Field plot 1200 show patterns of electric field radiations through patch-stub metal proximity sensor 300 when metal object 702 is placed at a proximity value 1202. The two regions of electric field, 1204 and 1206, show significant concentrations of electric field lines, indicating areas with a maximum field intensity. These regions are located around the outer edges of circular patch 308 and represent intense field interactions of approximately 2012 volts/meter. The presence of metal object 702 at a proximity value of 30 millimeters results in a concentrated and localized field distribution in these areas, demonstrating increased sensitivity of patch-stub metal proximity sensor 300 to changes in the values of proximity. The observed variations in the distribution of electric field provide a baseline for analyzing the performance of patch-stub metal proximity sensor 300 with variations in the values of proximity.

Figure 13:
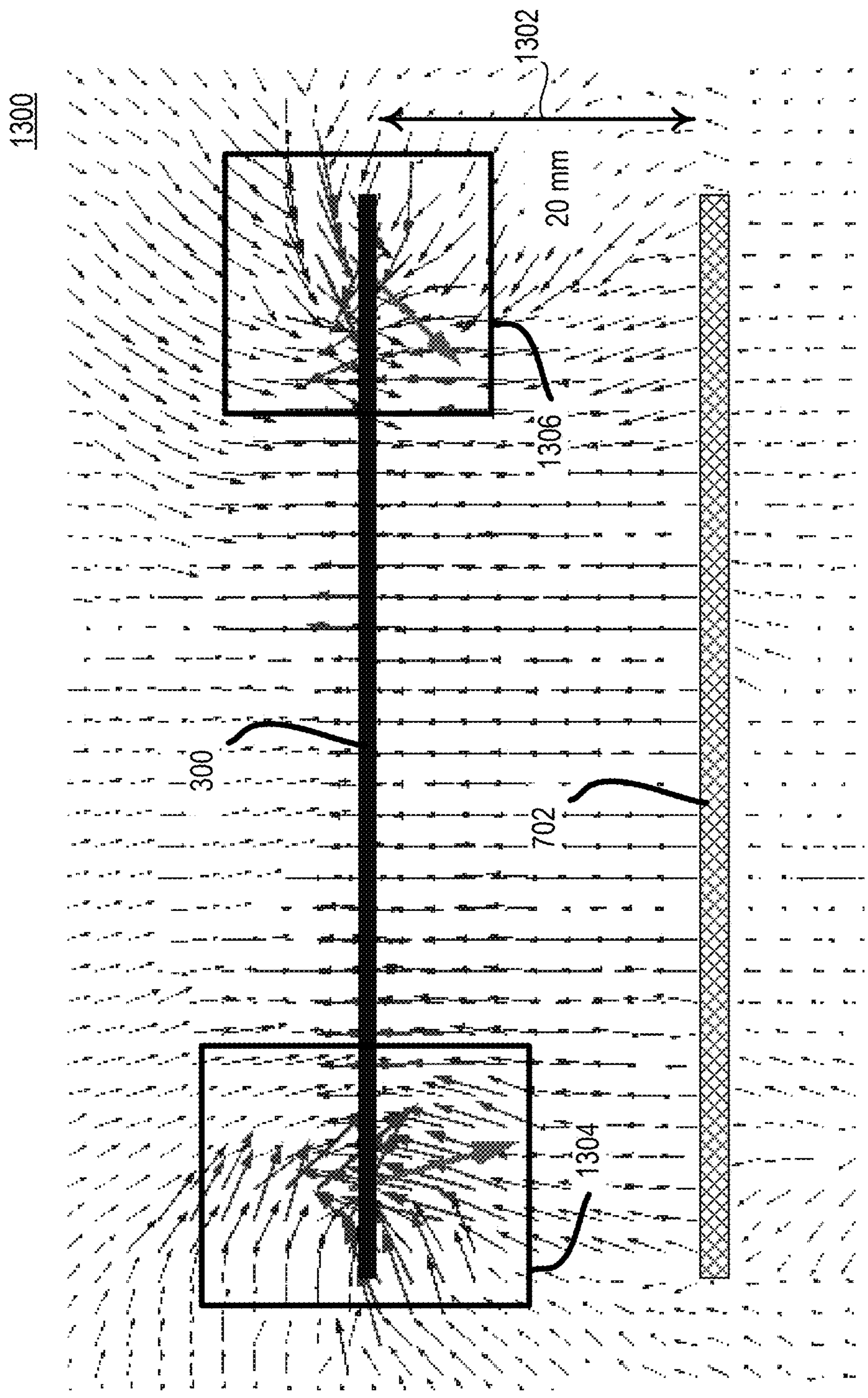
FIG. 13 is a field plot of a patch-stub metal proximity sensor, illustrating an electric field distribution that is orthogonal to a center of a patch in a presence of a metal object at a proximity value of 20 millimeters from the patch-stub metal proximity sensor, in accordance with at least one example.

FIG. 13 is a field plot 1300 of patch-stub metal proximity sensor 300, illustrating a distribution of the electric field in the presence of metal object 702 that is positioned at a proximity value 1302 of 20 millimeters, in accordance with at least one example. The two regions, 1304 and 1306, show significant concentration of electric field lines, indicating areas of maximum field intensity of approximately 2540 volts/meter. These regions, located around the outer edges of circular patch 308, are showing longer field lines compared to those at a proximity value 1202 of 30 millimeters of FIG. 12, which shows a relatively stronger field interaction. The presence of metal object 702 at a proximity value 1302 of 20 millimeters results in a concentrated and elongated field distribution in these areas, demonstrating increased sensitivity of patch-stub metal proximity sensor 300 to changes in the values of proximity. The observed variations in the distribution of electric field provide a baseline for analyzing the performance of patch-stub metal proximity sensor 300 with variations in the values of proximity.

Figure 14:
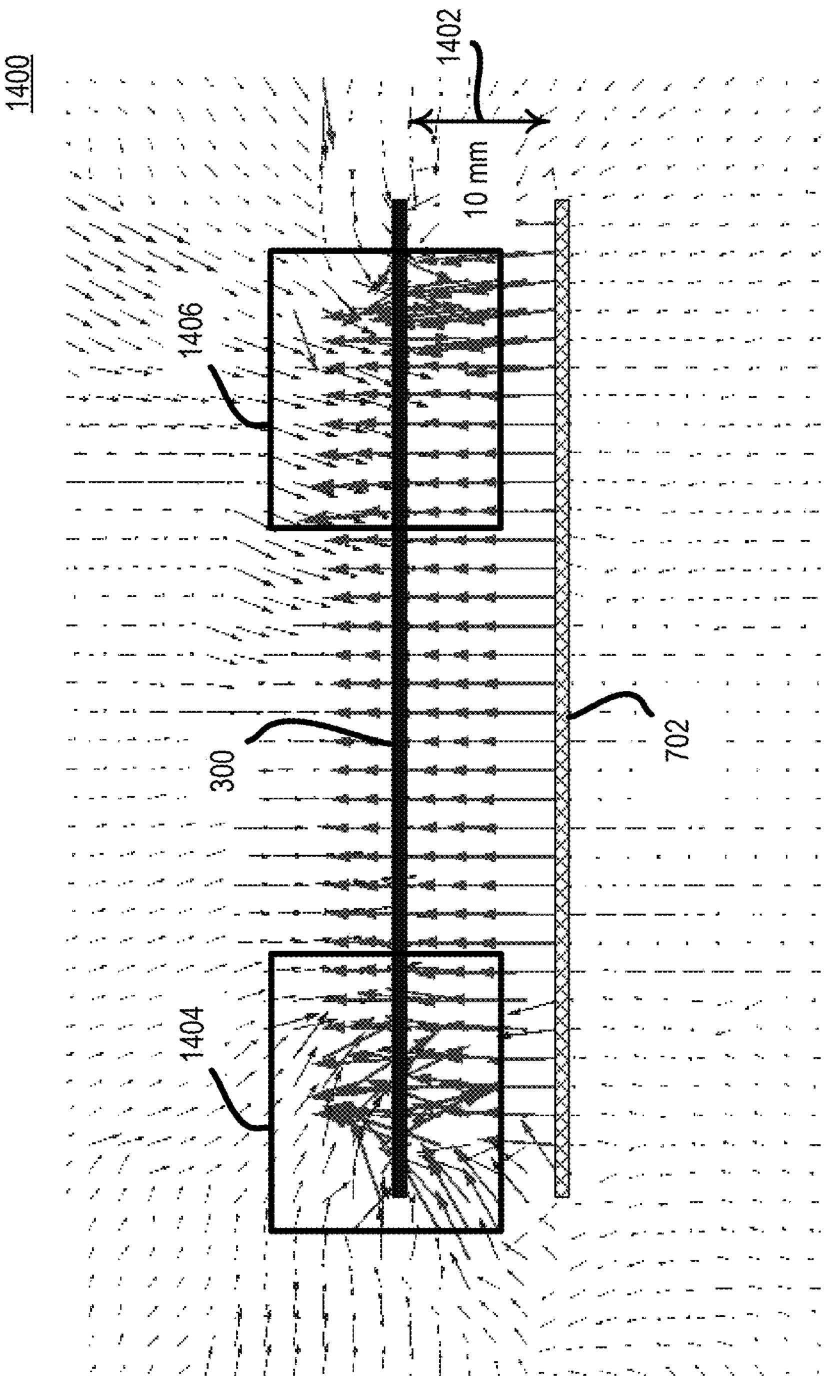
FIG. 14 is a field plot of a patch-stub metal proximity sensor, illustrating an electric field distribution that is orthogonal to the center of a patch-stub in a presence of a metal object at a proximity value of 10 millimeters from the patch-stub metal proximity sensor, in accordance with at least one example.

FIG. 14 is a field plot 1400 of patch-stub metal proximity sensor 300, illustrating the distribution of the electric field in the presence of metal object 702 that is positioned at a proximity 1402 value of 10 millimeters, in accordance with at least one example. Field plot 1400 illustrates two regions, 1404 and 1406, where the electric field lines are relatively longer and even more concentrated compared to proximity values 1202 and 1302 of 20 and 30 millimeters, respectively. Indicating areas of maximum field intensity of approximately 2540 volts/meter, these areas exhibit a maximum field intensity of approximately 2792 volts/meter that shows that this field is stronger than the ones observed at proximity values of 20 and 10 millimeters respectively, demonstrating increased sensitivity of patch-stub metal proximity sensor 300 to changes in the values of proximity. The observed variations in the distribution of electric field provide a baseline for analyzing the performance of patch-stub metal proximity sensor 300 with variations in the values of proximity.

Comparing plots 1200, 1300, and 1400 of FIG. 12, FIG. 13, and FIG. 14 respectively, plot 1400 shows the strongest electric field when metal object 702 is placed within 10 millimeters proximity of patch-stub metal proximity sensor 300. The electric field lines in regions 1404 and 1406 and even those outside these regions, are significantly longer and highly concentrated at 10 millimeters, indicating a stronger and more localized field interaction between the resonator and the metal object. This increased field strength at a proximity value of 10 millimeters demonstrates increased sensitivity and the capability of patch-stub metal proximity sensor 300 to detect proximity values with a greater precision, in accordance with at least one example. The field intensities increase from 2012 volts/meter to 2540 volts/meter to 2792 volts/meter when metal object 702 is placed at proximities of 30, 20, and 10 millimeters respectively. This demonstrates that as metal object 702 is placed nearer to patch-stub metal proximity sensor 300, the electric field interaction intensifies due to greater interactions between the patch-stub metal proximity sensor 300 and the metal object 702.

Figure 15:
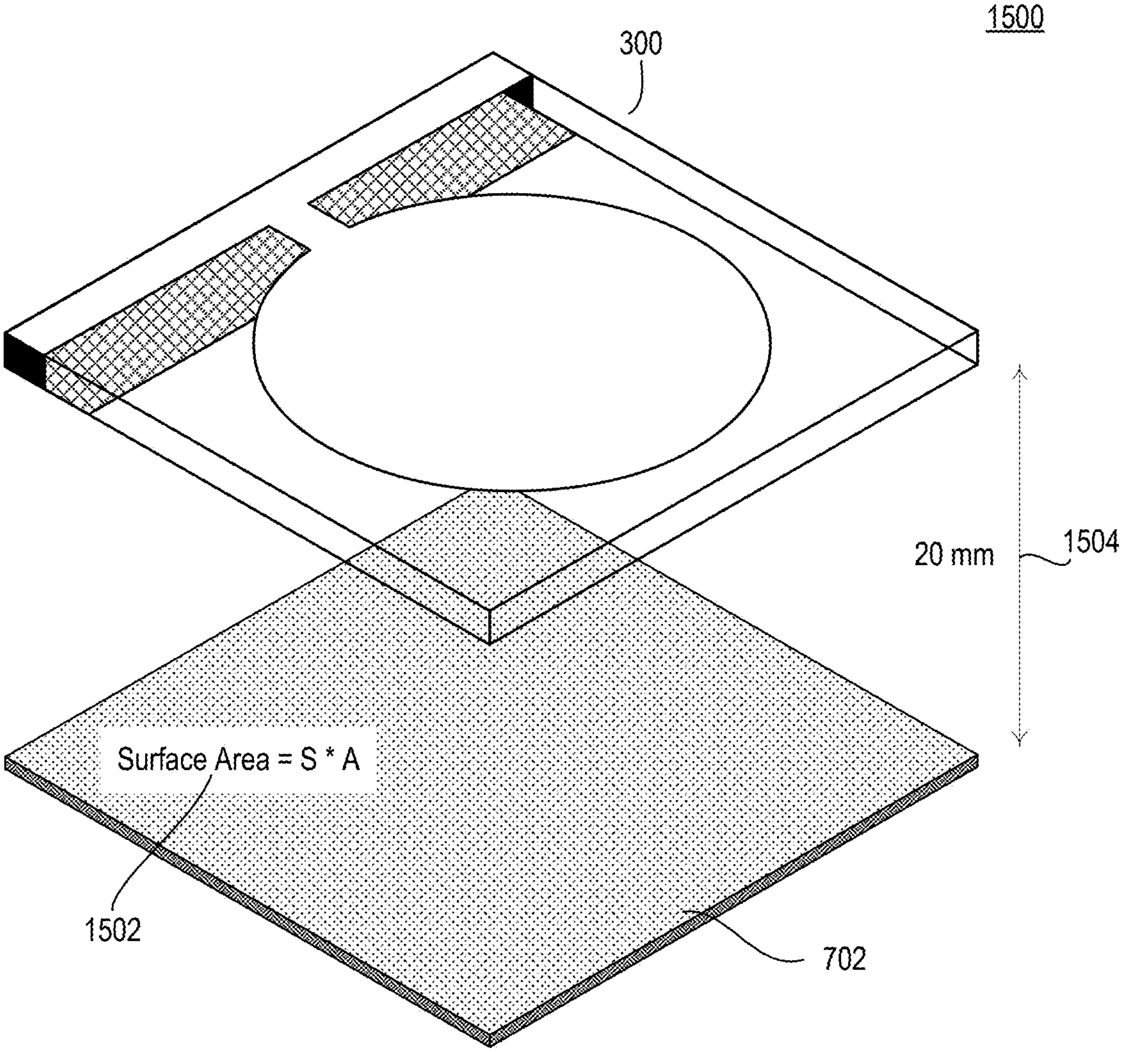
FIG. 15 is a schematic that illustrates a simulation setup in which a patch-stub metal proximity sensor is positioned above a metal object of a variable surface area at a proximity value of 20 millimeters, in accordance with at least one example.

FIG. 15 is a schematic that illustrates a simulation setup 1500 in which patch-stub metal proximity sensor 300 is positioned above metal object 702, where a surface area 1502 of metal object 702 is changed while keeping the proximity value 1504 constant at 20 millimeters, in accordance with at least one example. Unlike in FIG. 7, where the primary variable of interest was proximity value 704, FIG. 15 explores how changes in surface area 1502 of metal object 702 impact the response of patch-stub metal proximity sensor 300. Surface area 1502 is defined as:

$$\text{Surface Area 1502} = S * A \qquad \text{Eq. 1}$$

where, A is kept constant at 3840 $mm^2$, corresponding to a size of 60 millimeters by 64 millimeters of patch-stub metal proximity sensor 300, and S is varied, in accordance with at least one example. The variations in surface area 1502 may significantly affect the performance of patch-stub metal proximity sensor 300, particularly in terms of its S21 parameter and minimum impedance at node 706. As surface area 1502 is varied, it enhances the interaction between electric field of patch-stub metal proximity sensor 300 and metal object 702, leading to significant shifts in the resonant frequency and amplitude of a transmitted RF signal. This interaction can be modeled as a function of the surface area, where larger areas can induce stronger perturbations in the electric field.

In comparison to simulation setup 700 of FIG. 7 in which changes in proximity 704 value have influence S21 scattering parameter, simulation setup 1500 of FIG. 15 demonstrates that the surface area 1502 may also modulate the sensitivity of patch-stub metal proximity sensor 300. A larger surface area may significantly change impedances at node 706, potentially affecting the current drawn by patch-stub metal proximity sensor 300 and S21 scattering parameter. Consequently, it is established that the values of both proximity and surface area determine the performance of patch-stub metal proximity sensor 300 in not only detecting metal object 702 but also its distance and proximity from patch-stub metal proximity sensor 300.

Figure 16:
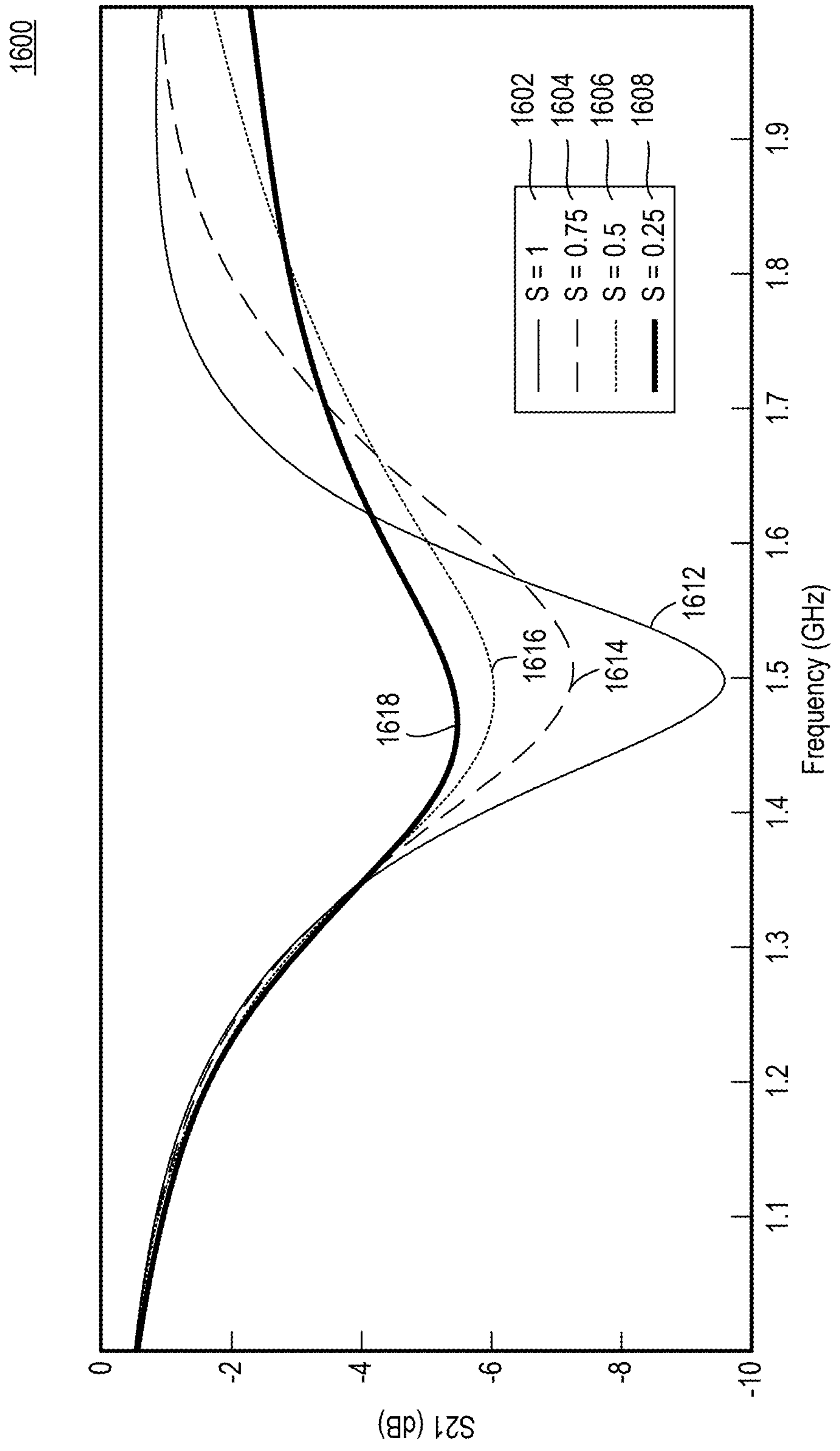
FIG. 16 is a plot of S21 scattering parameter of a patch-stub metal proximity sensor of FIG. 15, illustrating variations in the scattering parameter with changes in a surface area of a metal object, in accordance with at least one example.

FIG. 16 is a plot 1600 that illustrates a variation in S21 scattering parameter of patch-stub metal proximity sensor 300 as a function of surface area 1502 of metal object 702, with proximity 1504 value is kept constant at 20 millimeters, in accordance with at least one example. Plot 1600 extends simulation setup 1500 illustrated in FIG. 15, where surface area 1502 is varied by a scaling factor S, changing the overall area of metal object 702 that comes in contact with the electric field of patch-stub metal proximity sensor 300. At a scaling factor S 1602 of 1, and surface area 1502 of 3840 $mm^2$, curve 1612 shows a strong resonance at a frequency of 1.4965 GHz with an S21 value of −9.57 decibels. As S decreases to 0.75, surface area 1502 reduces to 2880 $mm^2$ (i.e., 0.75×3840 $mm^2$), curve 1614 shows a resonance at a frequency of 1.51 GHz with an S21 value of −7.24 decibels. When S is further reduced to 0.5, surface area 1502 reduces to 1920 $mm^2$, curve 1616 shows a resonance at a frequency of 1.4875 GHz with an S21 value of −6.04 decibels. Lastly, when S is reduced to 0.25, corresponding surface area 1502 becomes 960 $mm^2$, curve 1618 shows a resonance at a frequency of 1.4665 GHz with an S21 value of −5.47 decibels.

These results in plot 1600 demonstrate that as surface area 1502 of metal object 702 is decreased in experiments, the magnitude of a transmitted signal, determined by S21 parameter, also decreases, and the resonance frequency also is slightly decreased. This exhibits that patch-stub metal proximity sensor 300 is sensitive not only to the proximity value of metal object 702 but also to its surface area 1502, showing that larger areas result in stronger interactions of the electric field with metal object 702, and thus significantly pronounced resonant phenomenon occurs. These relationships show the capability of patch-stub metal proximity sensor 300 to detect variations in values of both proximity and surface area, making it a reliable sensor device for applications, requiring accurate detection of metal object 702 with its precise proximity to patch-stub metal proximity sensor 300.

Figure 17:
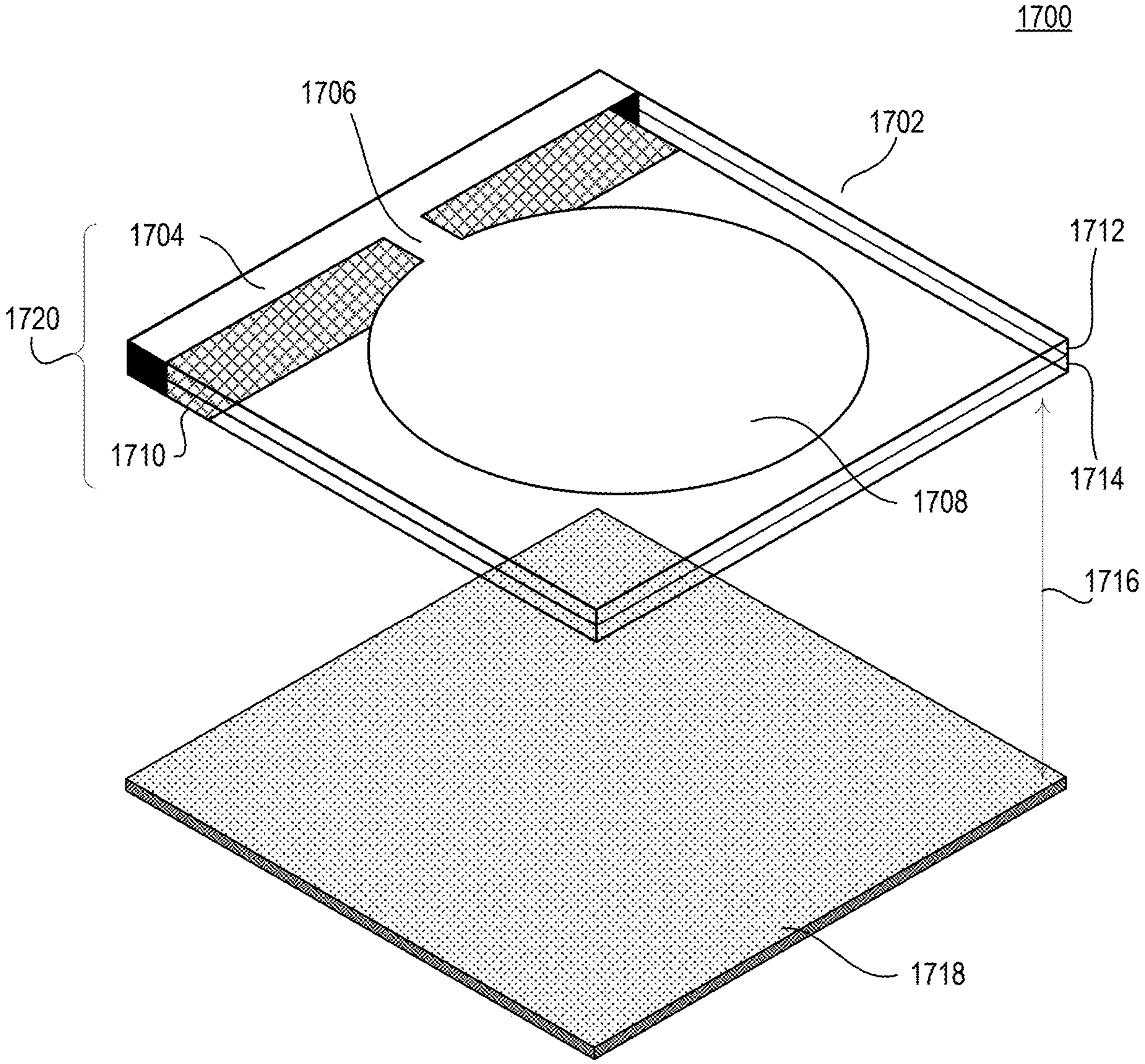
FIG. 17 is a schematic that illustrates an example structure of a patch-stub metal proximity sensor, featuring a dual-dielectric substrate, in accordance with at least one example.

FIG. 17 is a schematic that illustrates a simulation setup 1700 in which an example structure 1720 of patch-stub metal proximity sensor 300 features a dual-dielectric substrate 1702, in accordance with at least one example. Patch-stub metal proximity sensor 1720 comprises planar dielectric substrate 1702, a microstrip transmission line 1704, a feedline 1706, a circular patch 1708, and a ground conductor 1710 like that of microstrip transmission line 304, feedline 306, circular patch 308, and ground conductor 310, respectively, of patch-stub metal proximity sensor 300. Patch-stub metal proximity sensor 1720, however, utilizes dual-dielectric substrate 1702 comprising dielectrics 1712 and 1714, as compared to a single dielectric substrate 302 of FIG. 3. In at least one example, using multiple dielectric substrates (such as dual-dielectric substrate 1702) significantly enhances the performance of patch-stub metal proximity sensor 1720, as it stabilizes the resonant frequency, and optimizes sensitivity once the values of proximity 1716 of metal object 1718 are changed. These enhancements can make patch-stub metal proximity sensor 1720 more robust and reliable in applications, requiring accurate detection of metal objects and precisely measuring their proximity values, more specifically where environmental factors may distort the accuracy of patch-stub metal proximity sensor 1720.

Figure 18:
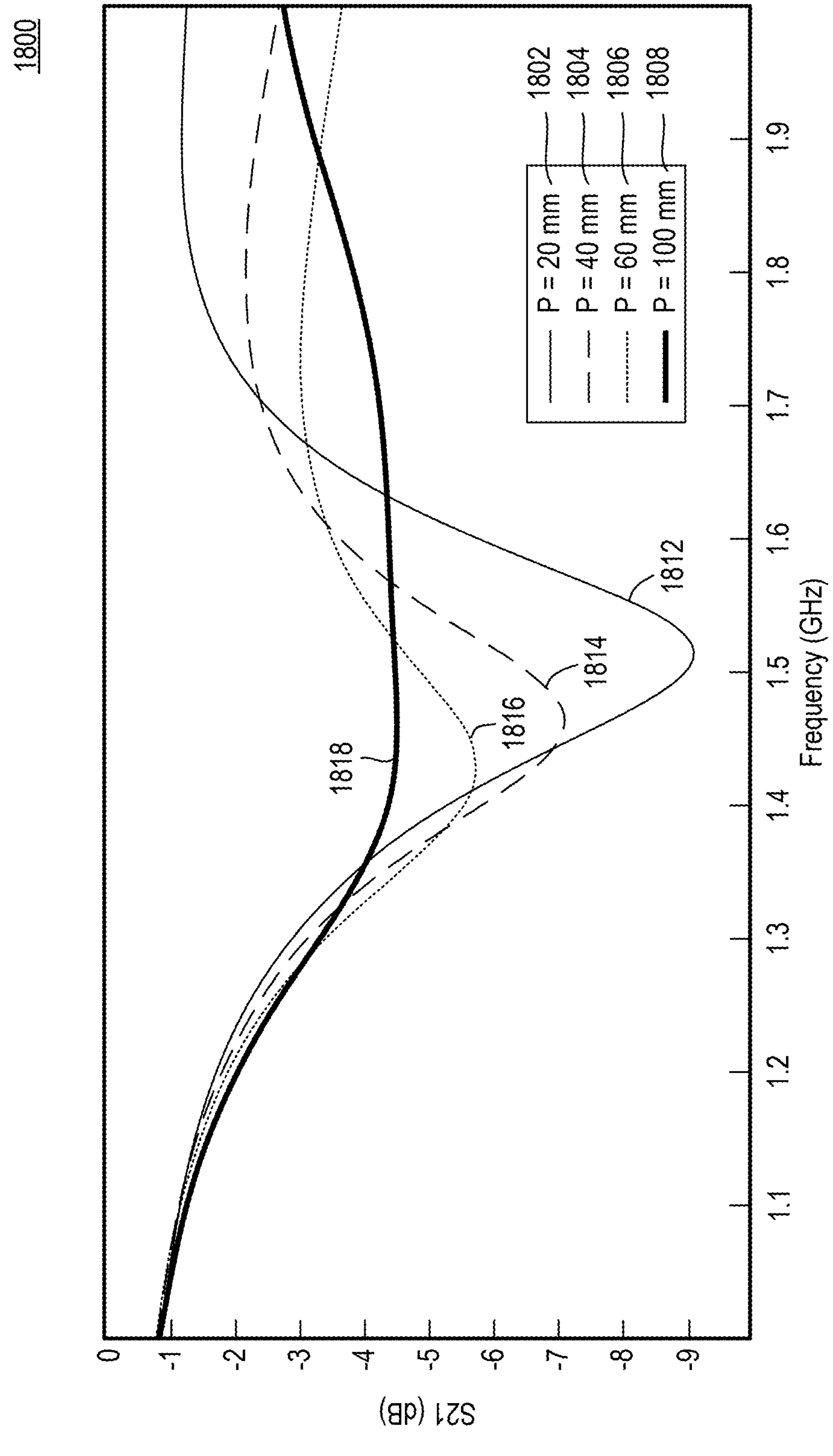
FIG. 18 is a plot of S21 scattering parameter of a patch-stub metal proximity sensor of FIG. 17, illustrating variations in the scattering parameter with changes in the proximity values of a metal object, in accordance with at least one example.

FIG. 18 is a plot 1800 of an S21 scattering parameter of the patch-stub metal proximity sensor 1720, illustrating variations in the S21 scattering parameter with changes in the proximity values of metal object 1718 of FIG. 17, in accordance with at least one example. At a proximity value 1802 of 20 millimeters, curve 1812 shows a strong resonance at a frequency of 1.514 GHz with an S21 value of −9.108 decibels. As the proximity value 1716 is increased to 40, 60, and 100 millimeters, the corresponding patterns of S21 parameter are shown by curves 1814, 1816, and 1818 respectively. Curve 1814 shows resonance at a frequency of 1.4625 GHz with an S21 value of −7.108 decibels, and curve 1816 shows a resonance at a frequency of 1.428 GHz with an S21 value of −5.732, and curve 1818 shows a resonance at a frequency of 1.46 GHz with an S21 value of −4.512 decibels. These shifts in the resonance patterns show a strong role of the values of proximity 1716 of metal object 1718 on the value of resonant frequency and amplitude of a transmitted signal; as a result, patch-stub metal proximity sensor 1720 can better determine proximity value 704 at which metal object 1718 is placed. Compared to patch-stub metal proximity sensor 300, patch-stub metal proximity sensor 1720 with dual-dielectric substrate 1702 offers superior accuracy in proximity detection of a metal object.

Figure 19:
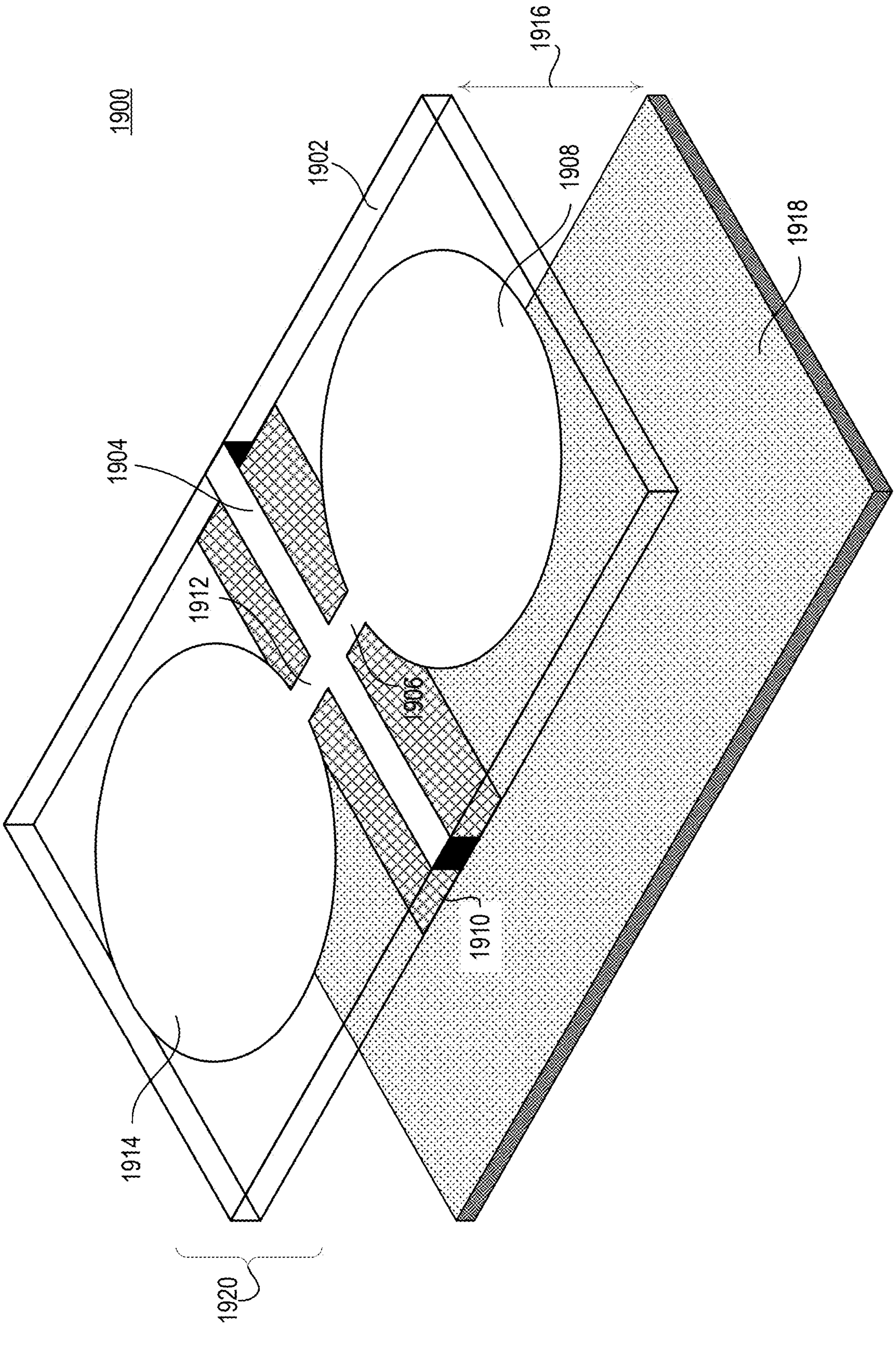
FIG. 19 is a schematic that illustrates another example structure of a patch-stub metal proximity sensor, featuring multiple patch-stubs, in accordance with at least one example.

FIG. 19 is a schematic that illustrates a simulation setup 1900 in which an example structure 1920 of patch-stub metal proximity sensor 300, featuring multiple patch-stubs, is shown in accordance with at least one example. Patch-stub metal proximity sensor 1920 comprises a microstrip transmission line 1904, a feedline 1906, and a circular patch 1908 like those of microstrip transmission line 304, feedline 306, and circular patch 308 of patch-stub metal proximity sensor 300 of FIG. 3. Patch-stub metal proximity sensor 1920, however, utilizes an extra feedline 1912 and circular patch 1914. In at least one example, patch-stub metal proximity sensor 1920 comprises a planar dielectric substrate 1902 and a ground conductor 1910 that is approximately twice as long as planar dielectric substrate 302 and ground conductor 310 of patch-stub metal proximity sensor 300 of FIG. 3. Ground conductor 1910 substantially overlaps microstrip transmission line 1904 and feedlines 1906 and 1912. In at least one example, circular patches 1908 and 1914 extend on either side of microstrip transmission line 1904, and provide increased number of resonant modes, and a broader frequency response, thereby refining the ability of patch-stub metal proximity sensor 1920 to detect subtle changes in proximity value 1916 of metal object 1918.

Figure 20:
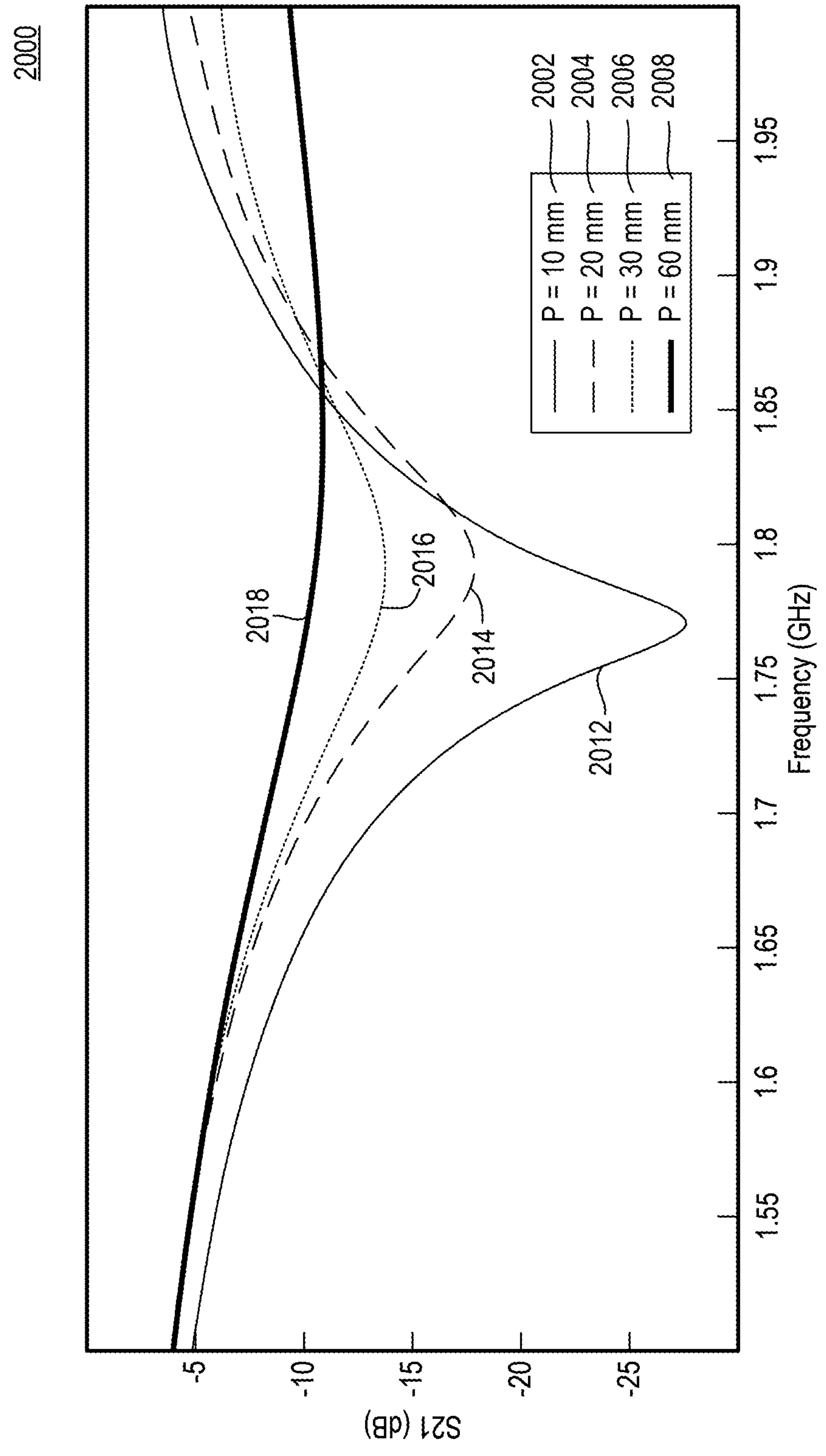
FIG. 20 is a plot of S21 scattering parameter of a patch-stub metal proximity sensor of FIG. 19, illustrating variations in the scattering parameter with changes in proximity values of a metal object, in accordance with at least one example.

FIG. 20 is a plot 2000 of an S21 scattering parameter of patch-stub metal proximity sensor 1920, illustrating variations in the S21 scattering parameter with changes in proximity value 1916 of metal object 1918 of FIG. 19, in accordance with at least one example. At a proximity value 2002 of 10 millimeters, curve 2012 shows a strong resonance at a frequency of 1.767 GHz with an S21 parameter value of −27.52 decibels. As proximity value 1916 increases to 20, 30, and 60 millimeters, the corresponding patterns of S21 parameter are shown by curves 2014, 2016, and 2018, respectively. Curve 2014 shows a resonance at a frequency of 1.7929 GHz with an S21 parameter value of −17.9 decibels, and curve 2016 shows a resonance at a frequency of 1.793 GHz with an S21 parameter value of −13.82 decibels, and curve 2018 shows a resonance at a frequency of 1.843 GHz with an S21 parameter value of −10.92 decibels. These shifts in the resonance patterns show a strong role of the values of proximity 1916 of metal object 1918 on the value of resonant frequency and amplitude of a transmitted signal; as a result, patch-stub metal proximity sensor 1920 can better determine proximity value 1916 at which metal object 1918 is placed. The use of multiple patch-stubs improves the frequency response and enables patch-stub metal proximity sensor 1920 to support a wider range of applications, where a precise proximity measurement is needed when the size of metal objects varies significantly or analyzing the frequency response at multiple frequencies is required for accurately detecting metal objects.

Figure 21:
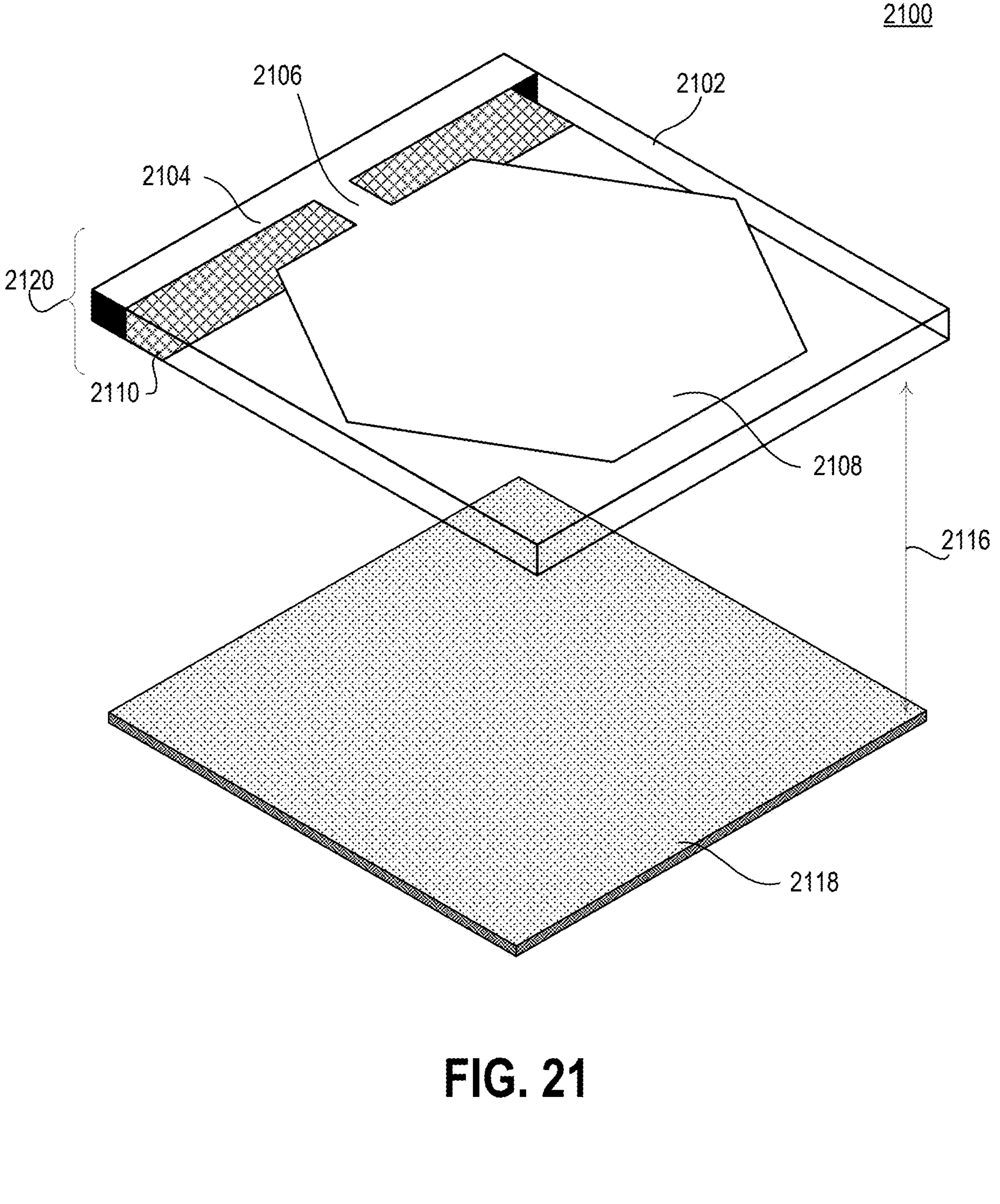
FIG. 21 is a schematic that illustrates another example structure of a patch-stub metal proximity sensor, featuring a hexagonal patch-stub, in accordance with at least one example.

FIG. 21 is a schematic that illustrates a simulation setup 2100 in which another example structure 2120 of patch-stub metal proximity sensor 300 is shown, featuring a hexagonal patch 2108, in accordance with at least one example. Patch-stub metal proximity sensor 2120 comprises a planar dielectric substrate 2102, a microstrip transmission line 2104, a feedline 2106, and a ground conductor 2110 like planar dielectric substrate 302, microstrip transmission line 304, feedline 306, and ground conductor 310, respectively, of patch-stub metal proximity sensor 300. Patch-stub metal proximity sensor 2120 has a hexagonal patch 2108 compared to the circular patch 308 of FIG. 3. In at least one example, using hexagonal patch 2108 increases the performance of patch-stub metal proximity sensor 2120, as the hexagonal shape improves the sensitivity of patch-stub metal proximity sensor 2120. Consequently, proximity value 2116 of metal object 2118 is precisely measured.

Figure 22:
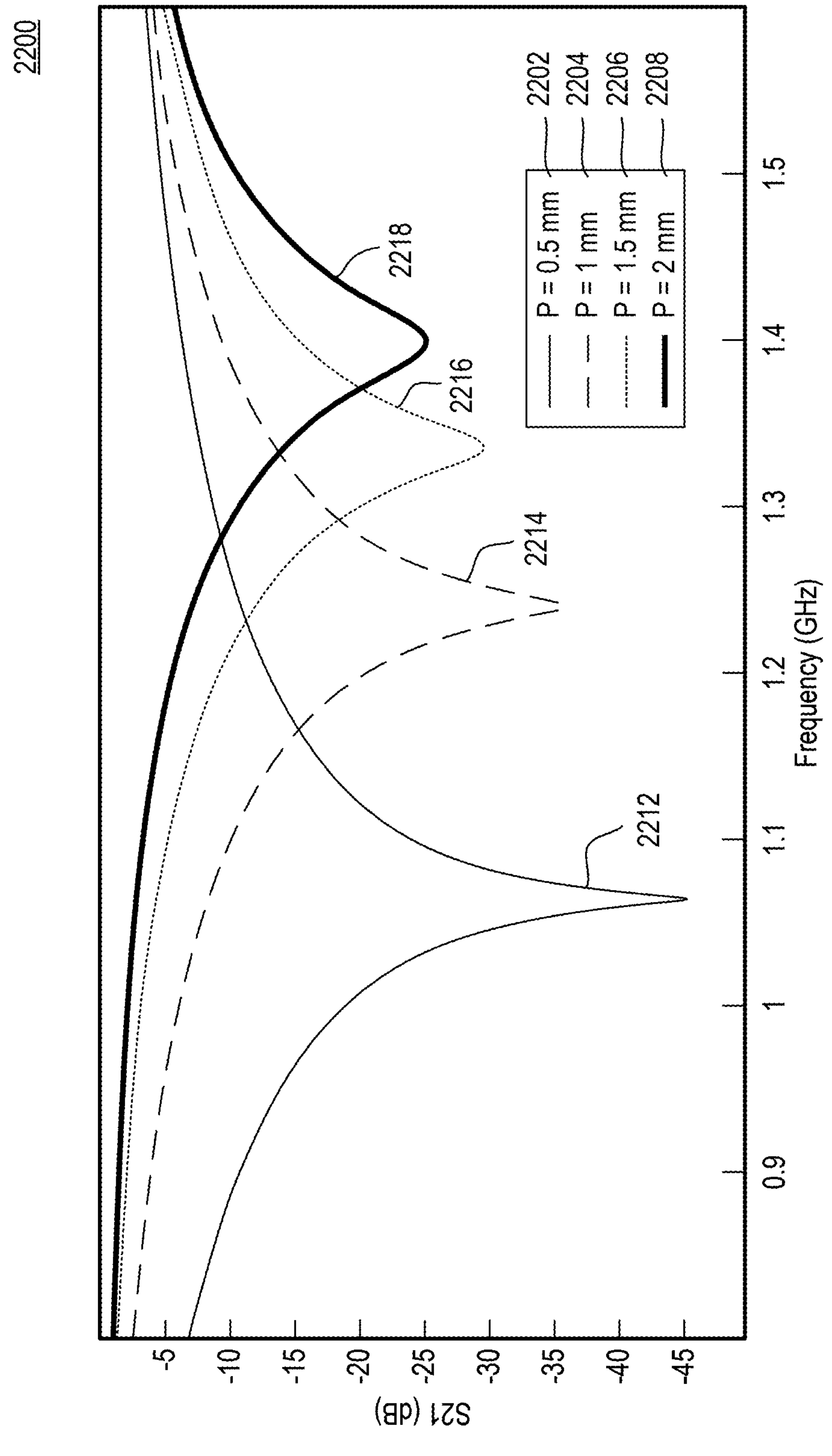
FIG. 22 is a plot of S21 scattering parameter of a patch-stub metal proximity sensor of FIG. 21, illustrating variations in the scattering parameter with changes in proximity values of a metal object, in accordance with at least one example.

FIG. 22 is a plot 2200 of an S21 scattering parameter of patch-stub metal proximity sensor 2120, illustrating variations in the S21 scattering parameter with changes in proximity value 2116 of metal object 2118 of FIG. 21, in accordance with at least one example. At a proximity value 2202 of 0.5 millimeters, curve 2212 shows a strong resonance at a frequency of 1.064 GHz with an S21 parameter value of −45.25 decibels. As proximity value 2116 is increased to 1, 1.5, and 2 millimeters, the corresponding patterns of S21 parameter are shown by curves 2214, 2216, and 2218, respectively. Curve 2214 shows a resonance at a frequency of 1.241 GHz with an S21 parameter value of −35.66 decibels, curve 2216 shows a resonance at a frequency of 1.336 GHz with an S21 parameter value of −29.68 decibels, and curve 2218 shows a resonance at a frequency of 1.399 GHz with an S21 parameter value of −25.19 decibels. These shifts in the resonance patterns show a strong role of the values of proximity 2116 of metal object 2118 on the values of resonant frequency and amplitude of a transmitted signal; as a result, patch-stub metal proximity sensor 2120 can better determine proximity value 1916 at which metal object 21118 is placed. The sharper frequency shifts and stronger attenuation at close proximities indicate that hexagonal patch 2108 is well-suited for applications requiring ultra-precise proximity measurements, such as detecting small distances in PCB stack-up analysis that requires inspections at high resolutions. Patch-stub metal proximity sensor 2120 provides a high scanning sensitivity, which enables utilizing the sensor in applications that require high resolution detection compared to patch-stub metal proximity sensor 300 with a circular patch 308.

Figure 23:
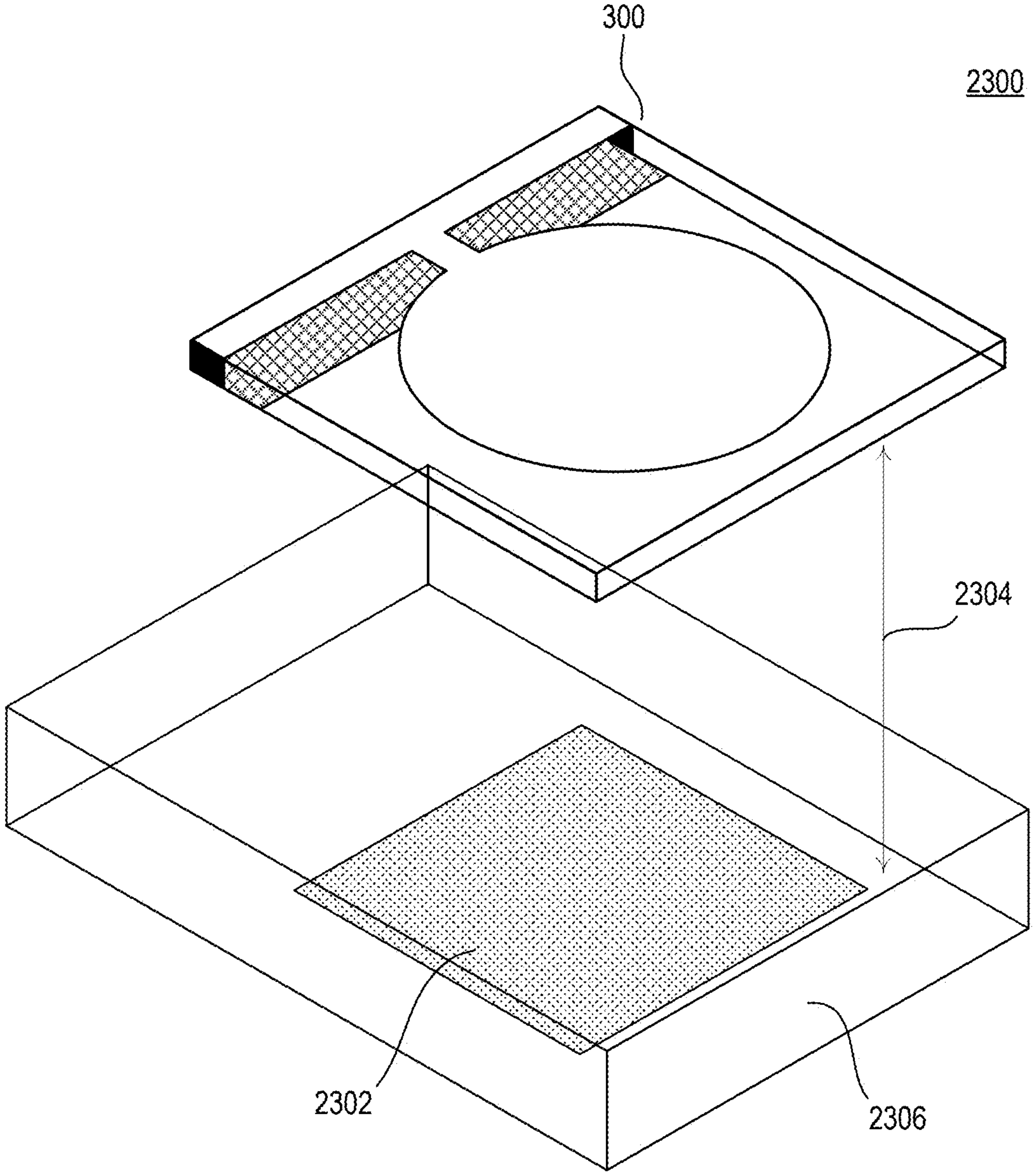
FIG. 23 is a schematic that illustrates an application in which a patch-stub metal proximity sensor is positioned above a concealed metal object at a proximity value, in accordance with at least one example.

FIG. 23 is a schematic that illustrates an application 2300 in which patch-stub metal proximity sensor 300 is used to detect a concealed metal object 2302 located at a proximity value 2304, in accordance with at least one example. Patch-stub metal proximity sensor 300 is designed for applications where the detection of both exposed and concealed (or buried) metal objects, such as a concealed metal object 2302, is required. In this application, concealed metal object 2302 is embedded within a dry soil 2306, demonstrating the effectiveness of patch-stub metal proximity sensor 300 in real-world environments. The patch-stub metal proximity sensor 300 is capable of accurately detecting the presence of the concealed metal object 2302 despite it being buried in a non-metallic medium (i.e., dry soil 2306), and measuring its proximity value 2304 with high precision.

Figure 24:
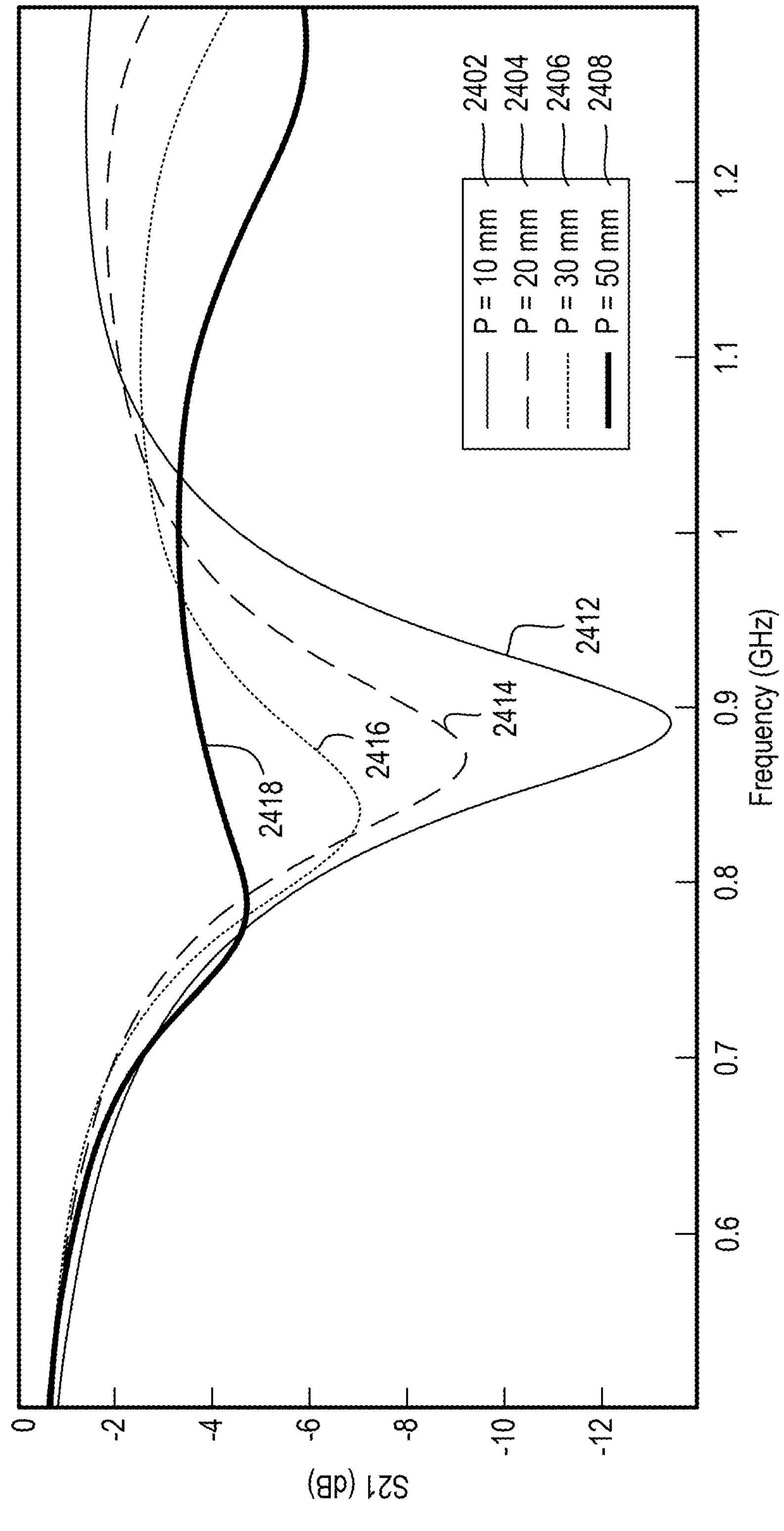
FIG. 24 is a plot of an S21 scattering parameter of a patch-stub metal proximity sensor, illustrating variations in the scattering parameter with changes in proximity values of the concealed metal object of FIG. 23, in accordance with at least one example.

FIG. 24 is a plot 2400 of an S21 scattering parameter of patch-stub metal proximity sensor 300, illustrating variations in the S21 scattering parameter with changes in proximity values 2304 of a concealed metal object 2302 of FIG. 23, in accordance with at least one example. In this application, at a proximity value 2402 of 10 millimeters, curve 2412 demonstrates a strong resonance at a frequency of 0.89 GHz with an S21 parameter value of −13.44. As proximity value 2304 increases to 20, 30, and 50 millimeters, the corresponding patterns of S21 parameter are shown by curves 2414, 2416, and 2418, respectively. Curve 2414 shows a resonance at a frequency of 0.8716 GHz with an S21 parameter value of −9.214 decibels, and curve 2416 shows a resonance at a frequency of 0.841 GHz with an S21 parameter value of −7.03 decibels, and curve 2418 shows a resonance at a frequency of 0.786 GHz with an S21 parameter value of −4.718 decibels. These shifts in the resonance patterns clearly demonstrate the effect of proximity value 2304 of the concealed metal object 2302 on both the resonant frequency and the amplitude of the transmitted signal. Consequently, patch-stub metal proximity sensor 300 can effectively determine proximity value 2304 of concealed metal object 2302 buried in dry soil 2306.

Figure 25:
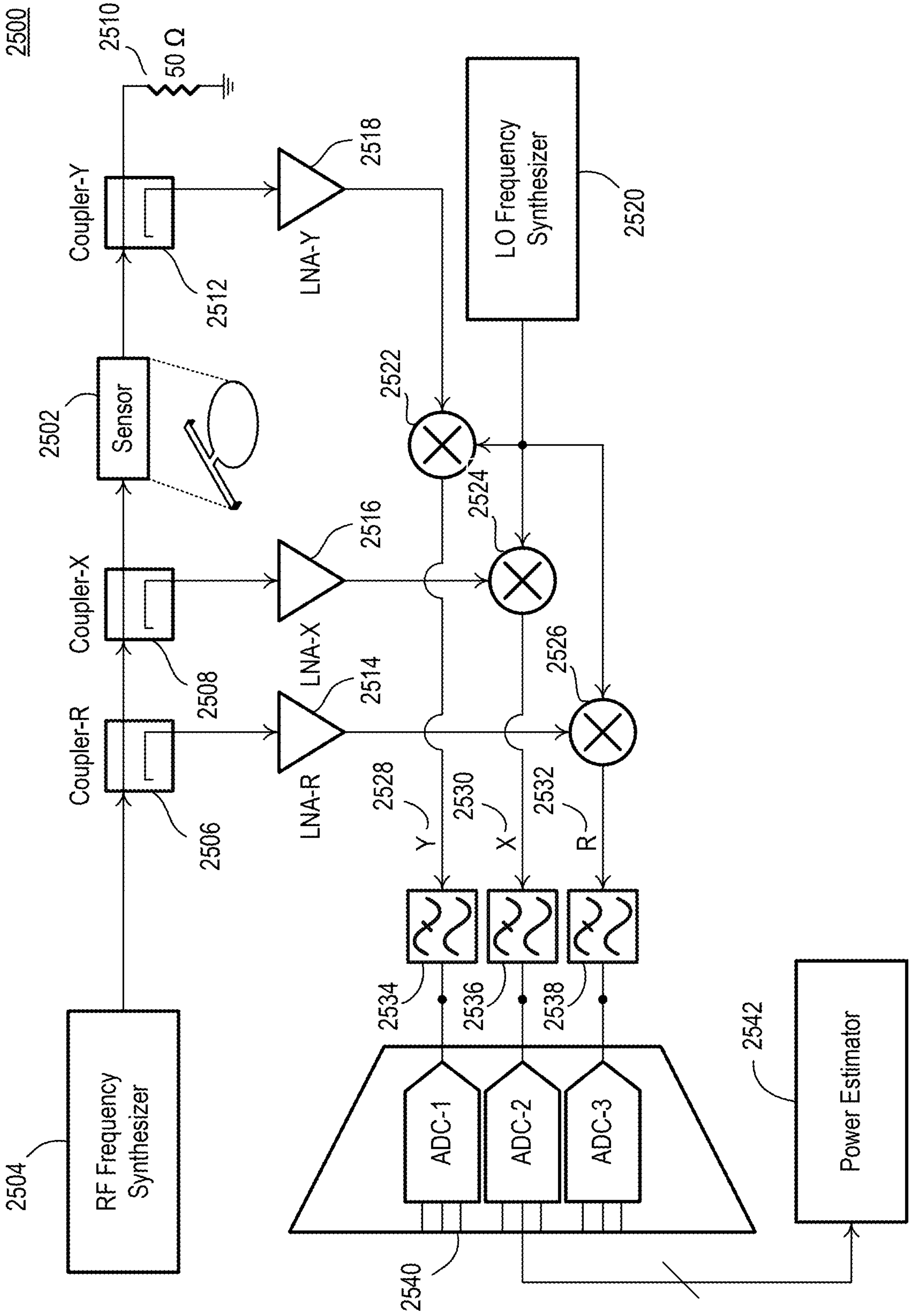
FIG. 25 is a schematic illustrating a circuit which is used to measure proximity of a metal object, using a patch-stub metal proximity sensor, in accordance with at least one example.

FIG. 25 is a schematic of a circuit 2500 that is used to measure the proximity of a metal object using a patch-stub metal proximity sensor 2502, in accordance with at least one example. Circuit 2500 employs an RF frequency synthesizer 2504, which generates a signal that is fed into patch-stub metal proximity sensor 2502 after it passes through two couplers: coupler-R 2506 and coupler-X 2508. Coupler-R 2506 provides a reference signal and coupler-X 2508 obtains a reflected signal from patch-stub metal proximity sensor 2502. The signal from patch-stub metal proximity sensor 2502 passes through coupler-Y 2512 that obtains the transmitted signal from patch-stub metal proximity sensor 2502. This path of circuit 2500 is terminated at a 50-ohm terminal 2510 to match the impedance. Signals from coupler-R 2506, coupler-X 2508, and coupler-Y 2512 are then amplified using low-noise amplifiers LNA-R 2514, LNA-X 2516, and LNA-Y 2518. LO frequency synthesizer 2520 generates a signal like the one generated by RF frequency synthesizer 2504, but it is shifted to 5 MHz, which is also the intermediate frequency (IF). The outputs of LNA-R 2514, LNA-X 2516, and LNA-Y 2518 are mixed with the output of LO frequency synthesizer 2520 using mixers 2522, 2524, and 2526. Mixed signals from mixers 2522, 2524, and 2526, therefore, will have a unique and distinct power level Y 2528, X 2530, and R 2532, respectively. After mixing, the signals pass through IF filters 2534, 2536, and 2538, to isolate an upper side band signal from a lower side band signal. The lower side band signals are converted to digital using a three-channel analog-to-digital converter (ADC) 2540. A power estimator 2542 then processes the digital output signals from ADC 2540 to determine the values of Y 2528, X 2530, and R 2532, along with their respective resonant frequencies.

$$S11 = \frac{X}{R} \quad \text{Eq. 2}$$

$$S21 = \frac{Y}{R} \quad \text{Eq. 3}$$

In this circuit, S11 scattering parameter is calculated using the Eq. 2, where X 2530 is the power level determined by coupler-X 2508 and R 2532 is the signal level determined by coupler-R 2506. Similarly, S21 scattering parameter is calculated using the Eq. 3, where Y 2528 is the signal level determined by coupler-Y 2512. The scattering parameters, S11 and S21, and resonant frequencies subsequently computed, are used to detect the proximity value of a metal object with high precision. In at least one example, patch-stub metal proximity sensor 2502 in circuit 2500 can represent any of the example structures of patch-stub metal proximity sensor 2502 including patch-stub metal proximity sensors 300, 1720, 1920, and 2120.

Figure 26:
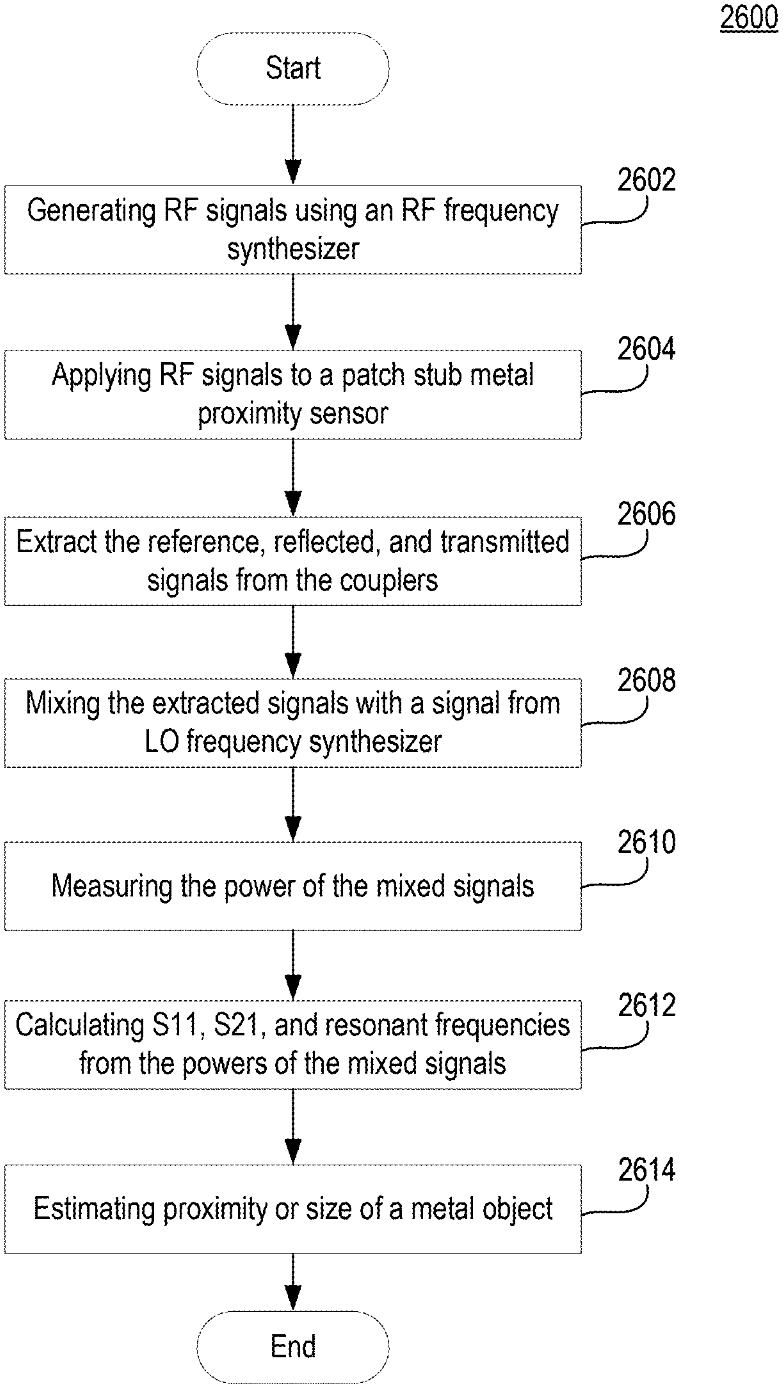
FIG. 26 is a flowchart of a method to detect a metal object using a patch-stub metal proximity sensor, in accordance with at least one example.

FIG. 26 illustrates a flowchart of a method 2600 for detecting the proximity of a metal object using patch-stub metal proximity sensor 2502, in accordance with at least one example. The method begins at block 2602, where RF signals are generated with an RF frequency synthesizer. At block 2604, the generated RF signals are applied to the patch-stub metal proximity sensor 2502, enabling interactions with any nearby metal objects. The sensor responds to these RF signals, and the subsequent interactions are essential for accurate proximity detection. At block 2606, the referenced, reflected, and transmitted signals are provided by the couplers that are associated with the patch-stub metal proximity sensor. The reference signal is provided by the first coupler-R 2506 after the RF frequency synthesizer, the reflected signal is provided by coupler X 2508 that feeds the patch-stub metal proximity sensor 2502, and transmitted signal is provided by coupler-Y 2512 that connects the patch-stub metal proximity sensor 2502 to a 50-ohm terminator.

At block 2608, the signals provided the couplers are mixed with a signal from the LO frequency synthesizer 2520. This mixing process shifts the frequency of the signals, enabling the system to effectively analyze the signal characteristics. At block 2610, the power of the mixed signals is measured, providing the necessary metrics for further analysis. At block 2612, the power values of the mixed signals are utilized to compute S11, S21, and resonant frequencies.

The S-parameters, S11 and S21, are used for characterizing the sensor's response when it is in the proximity of metal objects. Specifically, S11 is calculated by taking a ratio of the reflected power to the incident power, while S21 is calculated by taking a ratio of the transmitted power to the incident power, providing insights into the sensor's performance. As shown in FIG. 8, FIG. 9, FIG. 10, and FIG. 11, S21 scattering parameter, resonance frequency, and impedance of the patch-stub metal proximity sensor 300 varies with changes in proximity value 704 of a metal object 702. Based on the value of measured signal, the proximity or size of a metal object is calculated at block 2614.

In at least one example, the scanning of an area of interest can be performed manually or using an automated system, and the patch-stub metal proximity sensor is capable of detecting both exposed and concealed metal objects, as demonstrated by the application 2300 of FIG. 23, where the patch-stub metal proximity sensor is positioned above a concealed metal object 2302 buried in dry soil 2306 at a proximity value 2304. In at least one example, the patch-stub metal proximity sensor, used in method 2600, may be one of the patch-stub metal proximity sensors 300, 1720, 1920, 2120, or any combination thereof for a given application. In at least one example, the metal object may be exposed or buried in soil, dirt, wood, or any other materials. In at least one example, the proximity value of a metal object may be calculated by measuring a shift in the resonance, change in minimum S21 scattering parameter, or a change in the resonant frequency of the patch-stub metal proximity sensor.

Throughout specification, and in claims, "connected" may generally refer to a direct connection, such as electrical, mechanical, or magnetic connection between things that are connected, without any intermediary devices.

Here, "coupled" may generally refer to a direct or indirect connection, such as a direct electrical, mechanical, or magnetic connection between things that are connected or an indirect connection, through one or more passive or active intermediary devices.

Here, "adjacent" may generally refer to a position of a thing being next to (e.g., immediately next to or close to with one or more things between them) or adjoining another thing (e.g., abutting it).

Here, "resonator" may generally refer to a passive component consisting of a conductive strip patterned on a dielectric substrate. These resonators are designed to generate, select, or filter specific frequencies within microwave or RF circuits.

Here, "microstrip transmission line" may generally refer to a type of electrical transmission line used to convey microwave-frequency signals and more particularly to the planar conductive trace on the dielectric substrate in the patch-stub resonator, which carries the RF signal and interacts with the patch-stub to facilitate the detection of metal objects.

Here, "feedline" may generally refer to a transmission line that carries electrical signals from one point to another and more particularly to a conductive path that connects the microstrip transmission line to the patch-stub in the context of the patch-stub resonator, facilitating the transmission of RF signals for the purpose of metal detection.

Here, "RF port" may generally refer to a point of connection for radio frequency signals in a device or system and more particularly to the input and output terminals of the patch-stub resonator, where RF signals are applied and received.

Here, "patch-stub" may generally refer to a segment of a transmission line or conductor used to create a specific impedance or resonance condition and more particularly to the circular, polygonal, elliptical, or any other shaped conductive element in the patch-stub resonator, which interacts with the RF signal to enable the detection of metal objects by affecting the scattering parameters.

Here, "circular patch" and "hexagonal patch" may generally refer to circular and hexagonal conductive elements used in antenna or resonator designs and more particularly to the circular and hexagonal conductive elements in the patch-stub resonator, which form part of the resonating structure that interacts with RF signals to detect the proximity of metal objects by influencing the scattering parameters.

Here, "ground conductor" may generally refer to a conductive layer typically located beneath the microstrip structure that provides a return path for the electromagnetic fields generated by the resonator. In at least one example, ground conductor helps to establish the electrical characteristics of the microstrip structure and influence the resonant frequency and performance of the resonator.

Here, "planar dielectric substrate" may generally refer to a flat, typically thin, insulating material used as a base for constructing microstrip circuits and/or components with two substantially parallel surfaces. In the context of microstrip resonators, this substrate serves as the foundation surface on which the conductive traces and other components are deposited or etched. It provides mechanical support, electrical isolation, and defines the physical dimensions and characteristics of the microstrip resonator.

Here, "shorter ground conductor" may generally refer to a ground conductor that is reduced in length compared to standard designs and more particularly to the ground conductor in the patch-stub resonator that is shorter than typical ground conductors, enhancing the sensor's sensitivity to the proximity of metal objects by affecting the resonance characteristics.

Here, "resonant frequency" may generally refer to the natural frequency at which a system oscillates with maximum amplitude and more particularly to the frequency at which patch-stub resonator or patch-stub resonator resonates.

Here, "metal thickness" may generally refer to a layer of metal that is applied to a surface for protection, enhancement, or aesthetic purposes and more particularly to the layers of metal on either side of a printed circuit board.

Here, "Rogers RT/Duroid 6002" may generally refer to a type of high-frequency laminate material used in electronic circuit boards, known for its low dielectric loss and stable electrical properties and more particularly to a board by Rogers that has a dielectric constant of 2.94, substrate thickness of 0.762 millimeters and metal thickness of 18 micrometers.

Here, "detection range" may generally refer to the operational range within which a sensing device or system can accurately detect and measure a target or signal and more particularly to the range in which a dual resonator sensor or dual resonator device may exhibit a measurement response shift, when the object is within the operational range.

Here, "first surface," and "second surface" may generally refer to the surfaces relative to a reference point or direction and more particularly to two parallel surfaces of the planar dielectric substrate, each of which contains metal depositions to form a printed circuit board.

Here, "scattering parameters" may generally refer to a set of mathematical representations commonly used in electrical engineering and RF systems to characterize the behavior of linear electrical networks, such as resonators, filters, and transmission lines, in terms of signal propagation and interaction.

Here, "minimum S21" may generally refer to the minimum transmission strength of a system and more particularly to the minimum transmission strength of an RF signal that can pass through a patch-stub metal proximity sensor, within a frequency range of 1 MHz to 2 GHz, to generate a frequency response to detect a metal object.

Here, "electric field" may generally refer to a region of space around a charged particle or object within which an electric force is exerted on other charged particles or objects. In the context of the patch-stub resonator, the electric field is integral to the operation and detection mechanism, influencing the sensor's ability to detect and measure the presence or proximity of metal objects through variations in the field's intensity and distribution.

Here, "impedance" may generally refer to the measure of opposition that a circuit or component presents to the flow of signal at a particular frequency and more particularly to the input impedance seen at node of microstrip transmission line and feedline of patch-stub resonator.

Here, "frequency response" may generally refer to the characteristic behavior of a system or device across a range of frequencies, as described by its scattering parameters or DC output voltage.

Here, "shifting of response" may generally refer to the displacement or alteration in the behavior or characteristics of a system's output relative to changes in its input or operating conditions and more particularly to the change in the output of the dual-resonator sensor's DC voltage or scattering parameters when an object is within its detection range.

Here, "wideband signal source" generally refers to a device capable of generating signals covering a broad range of frequencies. In the context of microstrip resonators, a wideband signal source could be an instrument or module designed to produce RF or microwave signals with a wide frequency spectrum.

Here, "vector network analyzer" may generally refer to a sophisticated electronic instrument used to measure the electrical characteristics of radio frequency and microwave components, circuits, and systems. In the context of microstrip resonators, a vector network analyzer (VNA) plays a crucial role in characterizing their performance by analyzing parameters such as impedance, scattering parameters (S-parameters), and frequency response over a specified range.

Here, "transmittance" may generally refer to the measure of the ability of a sensor or device to allow the passage signals through it.

Here, "proximity" may generally refer to a proximity ranging from a few millimeters (0.1 mm minimum) to a few hundred millimeters (100 mm to 200 mm).

Here, "enhanced sensitivity" may generally refer to improved performance of dual resonator sensors in terms of detection sensitivity.

Here, "concealed metal object" may generally refer to a metal object that is buried inside a wall or plank and hence invisible to the naked eye such as nails inside a wooden plank or wires/pipes inside a wall.

Here, "RF frequency synthesizer" may generally refer to an electronic device that generates a stable, tunable radio frequency signal over a range of frequencies, and more particularly to a frequency synthesizer used to generate signals that are applied to the patch-stub metal proximity sensor.

Here, "coupler" may generally refer to a passive device that provides a specific fraction of the signal power traveling along a transmission line, and more particularly to one of the couplers which extract the referenced, reflected, and transmitted signals from the patch-stub metal proximity sensor.

Here, "impedance matching" may generally refer to the engineering practice of designing the impedance of a circuit such that it matches with that of the load or source to ensure maximum power transfer and minimum signal reflection.

Here, "low-noise amplifier (LNA)" may generally refer to an electronic amplifier that boosts weak signals, adding a minimum possible noise signal, and more particularly to amplifiers, which amplify the referenced, reflected, and transmitted signals.

Here, "LO frequency synthesizer" may generally refer to a local oscillator that generates a signal for mixing with another frequency, and more particularly to a frequency synthesizer which generates a signal with a 5 MHz frequency offset relative to the RF frequency synthesizer.

Here, "intermediate frequency (IF)" may generally refer to a lower frequency at which a high-frequency signal is shifted, during the process of mixing, simplifying the filtering and amplification processes.

Here, "mixer" may generally refer to an electronic component that combines two signals by multiplying them, producing sum and difference frequencies, and more particularly to mixers which mix the outputs from the LNAs with the LO signal generated by the LO frequency synthesizer.

Here, "analog-to-digital converter (ADC)" may generally refer to a device that converts continuous analog signals into discrete digital signals, and more particularly to the three-channel ADC, which digitizes the intermediate frequency signals for further processing.

Here, "power estimator" may generally refer to a device or algorithm that calculates the power level of a signal based on its amplitude, and more particularly to power estimator, which computes the power levels of the mixed signals from ADC.

Here, "S11" may generally refer to the scattering parameter that describes the reflection coefficient of a network, representing a ratio of the power of a reflected signal to the power of an incident signal at a given port.

Here, "S21" may generally refer to the scattering parameter that describes the transmission coefficient of a network, representing the ratio of the power of a transmitted signal to the power of an incident signal at a port.

Here, "signal" may generally refer to at least one current signal, voltage signal, magnetic signal, or data/clock signal. Here, meaning of "a," "an," and "the" include plural references. Here, meaning of "in" includes "in" and "on".

Here, terms "substantially," "close," "approximately," "near," and "about," generally refer to being within +/−10% of a target value. For example, unless otherwise specified in explicit context of their use, terms "substantially equal," "about equal" and "approximately equal" mean that there is no more than incidental variation between among things so described. In at least one embodiment, such variation is typically no more than +/−10% of a predetermined target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

Here, "left," "right," "front," "back," "top," "bottom," "over," "under," and the like in description and in claims, if any, are used for descriptive purposes and not necessarily for describing permanent relative positions. In at least one embodiment, "over," "under," "front side," "back side," "top," "bottom," "over," "under," and "on" as used herein refer to a relative position of one component, structure, or material with respect to other referenced components, structures or materials within a device, where such physical relationships are noteworthy. In at least one embodiment, these terms are employed herein for descriptive purposes only and predominantly within context of a device z-axis and therefore may be relative to an orientation of a device. In at least one embodiment, a first material "over" a second material in context of a figure provided herein may also be "under" second material if device is oriented upside-down relative to context of figure provided. In context of materials, one material disposed over or under another may be directly in contact or may have one or more intervening materials. Moreover, one material disposed between two materials may be directly in contact with two layers or may have one or more intervening layers. In at least one embodiment, a first material "on" a second material is in direct contact with that second material. Similar distinctions are to be made in context of component assemblies.

Here, "between" may be employed in context of z-axis, x-axis, or y-axis of a device. In at least one embodiment, a material that is between two other materials may be in contact with one or both of those materials, or may be separated from both of other two materials by one or more intervening materials. In at least one embodiment, a material "between" two other materials may therefore be in contact with either of other two materials, or may be coupled to other two materials through an intervening material. In at least one embodiment, a device that is between two other devices may be directly connected to one or both of those devices, or may be separated from both of other two devices by one or more intervening devices.

Reference in specification to "an embodiment," "one embodiment," "in at least one embodiment," "some embodiments," or "other embodiments" means that a particular feature, structure, or characteristic described in connection with embodiments is included in at least some embodiments, but not necessarily all embodiments. Various appearances of "an embodiment," "one embodiment," "in at least one embodiment," or "some embodiments" are not necessarily all referring to same embodiments. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Furthermore, particular features, structures, functions, or characteristics may be combined in any suitable manner in one or more embodiments. For example, a first embodiment may be combined with a second embodiment anywhere particular features, structures, functions, or characteristics associated with two embodiments are not mutually exclusive.

While at least one embodiment has been described in conjunction with specific embodiments thereof, many alternatives, modifications and variations of such embodiments will be apparent to those of ordinary skill in the art considering description herein. At least one embodiment is intended to embrace all such alternatives, modifications, and variations as to fall within broad scope of appended claims.

In addition, well-known power/ground connections to resonators and other components may or may not be shown within presented figures, for simplicity of illustration and discussion, and so as not to obscure any embodiment. Further, arrangements may be shown in block diagram form to avoid obscuring any embodiment, and in view of the fact that specifics with respect to implementation of such block diagram arrangements are dependent upon the platform within which an embodiment is to be implemented (e.g., such specifics should be well within purview of one skilled in art). Where specific details (e.g., dimensions) are set forth to describe example embodiments of disclosure, it should be apparent to one skilled in art that disclosure can be practiced without, or with variation of, these specific details. Description of an embodiment is thus to be regarded as illustrative instead of limiting.

In at least one embodiment, structures described herein can also be described as method(s) of forming those structures or apparatuses, and method(s) of operation of these structures or apparatuses. Following examples are provided that illustrate at least one embodiment. An example can be combined with any other example. As such, at least one example can be combined with at least another example without changing scope of an example.

Example 1 is an apparatus comprising: a planar dielectric substrate having a first surface and a second surface; a microstrip transmission line on the first surface; a patch-stub on the first surface substantially below the microstrip transmission line; a feedline on the first surface substantially extending away from the microstrip transmission line, wherein the feedline electrically connects the microstrip transmission line and the patch-stub; and a ground conductor on the second surface beneath the microstrip transmission line, wherein the planar dielectric substrate insulates the ground conductor from the microstrip transmission line, the patch-stub, and the feedline.

Example 2 is an apparatus according to any examples herein, in particular example 1, wherein the patch-stub is to resonate at a resonant frequency, and wherein the resonant frequency is in microwave, millimeter wave, or terra hertz communication bands.

Example 3 is an apparatus according to any examples herein, in particular example 1, wherein the patch-stub has one of polygonal shape, circular shape, elliptical shape, or any combination thereof.

Example 4 is an apparatus according to any examples herein, in particular example 1, wherein the planar dielectric substrate comprises one or more dielectric materials.

Example 5 is an apparatus according to any examples herein, in particular example 1, wherein the ground conductor substantially overlaps the microstrip transmission line and the feedline.

Example 6 is an apparatus according to any examples herein, in particular example 1, wherein the patch-stub includes one or more slits to modify current distribution within the patch-stub.

Example 7 is an apparatus according to any examples herein, in particular example 1, wherein the first surface includes: one or more patch-stubs on either side of the microstrip transmission line to increase bandwidth of the apparatus; and one or more feedlines, wherein an individual feedline of the one or more feedlines electrically connects the microstrip transmission line and an individual patch-stub of the one or more patch-stubs.

Example 8 is an apparatus comprising: a planar dielectric substrate having a first surface and a second surface; a microstrip transmission line on the first surface; a first patch-stub on the first surface substantially below the microstrip transmission line; a first feedline on the first surface substantially extending away from the microstrip transmission line, wherein the first feedline electrically connects the first patch-stub and the microstrip transmission line; a second patch-stub on the first surface substantially above the microstrip transmission line; a second feedline on the first surface substantially extending away from the microstrip transmission line, wherein the second feedline electrically connects the second patch-stub and the microstrip transmission line; and a ground conductor on the second surface, wherein the planar dielectric substrate insulates the ground conductor from the microstrip transmission line, the first and second patch-stubs, and the first and second feedlines.

Example 9 is an apparatus according to any examples herein, in particular example 8, wherein the first patch-stub and the second patch-stub are to resonate at one or more resonant frequencies, wherein the one or more resonant frequencies are in microwave, millimeter wave, or terra hertz communication bands.

Example 10 is an apparatus according to any examples herein, in particular example 8, wherein each of the first patch-stub and the second patch-stub has one of polygonal shape, circular shape, elliptical shape, or any combination thereof.

Example 11 is an apparatus according to any examples herein, in particular example 8, wherein the planar dielectric substrate comprises one or more dielectric materials.

Example 12 is an apparatus according to any examples herein, in particular example 8, wherein the first surface includes: one or more patch-stubs on either side of the microstrip transmission line to increase bandwidth of the apparatus; and one or more feedlines, wherein an individual feedline of the one or more feedlines electrically connects the microstrip transmission line and an individual patch-stub of the one or more patch-stubs.

Example 13 is an apparatus according to any examples herein, in particular example 8, wherein the ground conductor substantially overlaps the microstrip transmission line and at least one of the first or second feedlines.

Example 14 is an apparatus according to any examples herein, in particular example 8, wherein the first patch-stub or second patch-stub includes one or more slits to modify current distribution within the first patch-stub or the second patch-stub.

Example 15 is a method of metal proximity detection using a patch-stub metal proximity sensor, the method comprising: generating a signal with a signal source; applying the signal to a microstrip transmission line; feeding the signal to a patch-stub through a feedline, wherein the feedline electrically connects the microstrip transmission line and the patch-stub; receiving a plurality of signals from the microstrip transmission line; measuring a proximity of a metal object by calculating a perturbation in a power value of the plurality of signals; and outputting a decision about presence or absence of the metal object in a proximity of the patch-stub metal proximity sensor.

Example 16 is a method according to any examples herein, in particular example 15, wherein the patch-stub is to resonate at a resonant frequency, and wherein the resonant frequency is in microwave, millimeter wave, or terra hertz communication bands.

Example 17 is a method according to any examples herein, in particular example 15, wherein the patch-stub of the patch-stub metal proximity sensor has one of polygonal shape, circular shape, elliptical shape, or any combination thereof.

Example 18 is a method according to any examples herein, in particular example 15, wherein the proximity of the metal object is detected by the power value of the plurality of signals received from the microstrip transmission line.

Example 19 is a method according to any examples herein, in particular example 15, wherein a size of the metal object is detected by the power value of the plurality of signals received from the microstrip transmission line.

Example 20 is a method according to any examples herein, in particular example 15, wherein a vector network analyzer is to detect the metal object within a detection range of the patch-stub metal proximity sensor, wherein the vector network analyzer is coupled to the microstrip transmission line, wherein the detection range of the patch-stub metal proximity sensor is determined by a configuration and dimensions of the patch-stub and the feedline, and wherein the vector network analyzer is to measure scattering parameters.

Example 21 is a method according to any examples herein, in particular example 15, wherein the metal object is concealed under a surface.

Example 22 is an apparatus of a patch-stub metal proximity sensor, the apparatus comprising: a planar dielectric substrate to provide electrical insulation; a microstrip transmission line on a first surface of the planar dielectric substrate; one or more patch-stubs on the first surface of the planar dielectric substrate substantially below the microstrip transmission line; one or more feedlines on the first surface of the planar dielectric substrate extending away from the microstrip transmission line, wherein an individual feedline of the one or more feedlines electrically connects an individual patch-stub of the one or more patch-stubs and the microstrip transmission line; and a ground conductor on a second surface of the planar dielectric substrate beneath the microstrip transmission line.

Example 23 is an apparatus according to any examples herein, in particular example 22, wherein the individual patch-stub of the one or more patch-stubs is to resonate at a resonant frequency, and wherein the resonant frequency is in microwave, millimeter wave, or terra hertz communication bands.

Example 24 is an apparatus according to any examples herein, in particular example 22, wherein the individual patch-stub of the one or more patch-stubs has one of: polygonal shape; circular shape; elliptical shape; or any combination thereof.

Example 25 is an apparatus according to any examples herein, in particular example 22, wherein the planar dielectric substrate comprises one or more dielectric materials.

Example 26 is an apparatus according to any examples herein, in particular example 22, wherein the ground conductor substantially overlaps the microstrip transmission line and the one or more feedlines.

Example 27 is an apparatus comprising: a planar dielectric substrate having a first surface and a second surface, wherein the planar dielectric constitutes one or more dielectric materials; a microstrip transmission line on the first surface; a patch-stub on the first surface substantially below the microstrip transmission line; a feedline on the first surface substantially extending away from the microstrip transmission line, wherein the feedline electrically connects the microstrip transmission line and the patch-stub; and a ground conductor on the second surface beneath the microstrip transmission line, wherein the planar dielectric substrate insulates the ground conductor from the microstrip transmission line, the patch-stub, and the feedline.

Example 28 is an apparatus according to any examples herein, in particular example 27, wherein the patch-stub is to resonate at a resonant frequency, and wherein the resonant frequency is in microwave, millimeter wave, or terra hertz communication bands.

Example 29 is an apparatus according to any examples herein, in particular example 27, wherein the patch-stub has one of polygonal shape, circular shape, elliptical shape, or any combination thereof.

Example 30 is an apparatus according to any examples herein, in particular example 27, wherein the ground conductor substantially overlaps the microstrip transmission line and the feedline.

Example 31 is an apparatus according to any examples herein, in particular example 27, wherein the patch-stub includes one or more slits to enhance performance of the apparatus.

Example 32 is an apparatus according to any examples herein, in particular example 27, wherein the first surface includes: one or more patch-stubs on either side of the microstrip transmission line; and one or more feedlines, wherein an individual feedline of the one or more feedlines electrically connects the microstrip transmission line and an individual patch-stub of the one or more patch-stubs.

Example 33 is a method of metal proximity detection using a patch-stub metal proximity sensor, the method comprising: generating a signal with a vector network analyzer; applying the signal to a microstrip transmission line; feeding the signal to a patch-stub through a feedline, wherein the feedline electrically connects the microstrip transmission line and the patch-stub; receiving a signal from the microstrip transmission line using the vector network analyzer; measuring a proximity of a metal object by calculating a perturbation in the scattering parameter; and outputting a decision about presence or absence of the metal object in a proximity of the patch-stub metal proximity sensor.

Example 34 is a method according to any examples herein, in particular example 33, wherein the patch-stub is to resonate at a resonant frequency, and wherein the resonant frequency is in the frequency sweep of the vector network analyzer.

Example 35 is a method according to any examples herein, in particular example 33, wherein the patch-stub of the patch-stub metal proximity sensor has one of polygonal shape, circular shape, elliptical shape, or any combination thereof.

Example 36 is a method according to any examples herein, in particular example 33, wherein the proximity of the metal object is detected by the power value of the plurality of signals received from the microstrip transmission line.

Example 37 is a method according to any examples herein, in particular example 33, wherein a size of the metal object is detected by the power value of the plurality of signals received from the microstrip transmission line.

Example 38 is a method according to any examples herein, in particular example 33, wherein the metal object is concealed under a surface.

What is claimed is:

1. An apparatus comprising:

a planar dielectric substrate having a first surface and a second surface;

a microstrip transmission line on the first surface;

a patch-stub on the first surface substantially below the microstrip transmission line;

a feedline on the first surface substantially extending away from the microstrip transmission line, wherein the feedline electrically connects the microstrip transmission line and the patch-stub; and a ground conductor on the second surface beneath the microstrip transmission line, wherein the planar dielectric substrate insulates the ground conductor from the microstrip transmission line, the patch-stub, and the feedline, wherein the patch-stub is a first patch-stub, wherein the feedline is a first feedline, wherein the first patch-stub is on a first side of the microstrip transmission line, wherein the apparatus includes:

a second patch-stub on a second side of the microstrip transmission line, wherein the second patch-stub is configured to increase bandwidth of a designated frequency band of the apparatus; and a second feedline substantially extending away from the microstrip transmission line, wherein the second feedline electrically connects the microstrip transmission line and the second patch-stub.

2. The apparatus of claim 1, wherein the patch-stub is to resonate at a resonant frequency, and wherein the resonant frequency is in microwave, millimeter wave, or terra hertz communication bands.

3. The apparatus of claim 1, wherein the patch-stub has one of polygonal shape, circular shape, elliptical shape, or any combination thereof.

4. The apparatus of claim 1, wherein the planar dielectric substrate comprises one or more dielectric materials.

5. The apparatus of claim 1, wherein the ground conductor substantially overlaps the microstrip transmission line and the feedline.

6. The apparatus of claim 1, wherein the patch-stub includes one or more slits configured to modify a distribution of a flowing current within the patch-stub.

7. An apparatus comprising:

a planar dielectric substrate having a first surface and a second surface;

a microstrip transmission line on the first surface;

a first patch-stub on the first surface substantially below the microstrip transmission line;

a first feedline on the first surface substantially extending away from the microstrip transmission line, wherein the first feedline electrically connects the first patch-stub and the microstrip transmission line;

a second patch-stub on the first surface substantially above the microstrip transmission line;

a second feedline on the first surface substantially extending away from the microstrip transmission line, wherein the second feedline electrically connects the second patch-stub and the microstrip transmission line; and a ground conductor on the second surface, wherein the planar dielectric substrate insulates the ground conductor from the microstrip transmission line, the first and second patch-stubs, and the first and second feedlines.

8. The apparatus of claim 7, wherein the first patch-stub and the second patch-stub are configured to resonate at one or more resonant frequencies, wherein the one or more resonant frequencies are in microwave, millimeter wave, or terra hertz communication bands.

9. The apparatus of claim 7, wherein each of the first patch-stub and the second patch-stub has one of polygonal shape, circular shape, elliptical shape, or any combination thereof.

10. The apparatus of claim 7, wherein the planar dielectric substrate comprises one or more dielectric materials.

11. The apparatus of claim 7, wherein the ground conductor substantially overlaps the microstrip transmission line and at least one of the first or second feedlines.

12. The apparatus of claim 7, wherein the first patch-stub or the second patch-stub includes one or more slits, wherein the one or more slits are configured to change distribution of a flowing current within the first patch-stub or the second patch-stub.

* * * * *